United States Patent
Cheon et al.

(10) Patent No.: US 9,300,957 B2
(45) Date of Patent: Mar. 29, 2016

(54) VIDEO ENCODING METHOD FOR ENCODING HIERARCHICAL-STRUCTURE SYMBOLS AND A DEVICE THEREFOR, AND VIDEO DECODING METHOD FOR DECODING HIERARCHICAL-STRUCTURE SYMBOLS AND A DEVICE THEREFOR

(75) Inventors: Min-su Cheon, Yongin-si (KR); Jung-hye Min, Suwon-si (KR); Woo-jin Han, Suwon-si (KR); Tammy Lee, Seoul (KR); Sun-il Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 316 days.

(21) Appl. No.: 13/877,102

(22) PCT Filed: Sep. 30, 2011

(86) PCT No.: PCT/KR2011/007218
§ 371 (c)(1),
(2), (4) Date: Mar. 29, 2013

(87) PCT Pub. No.: WO2012/044104
PCT Pub. Date: Apr. 5, 2012

(65) Prior Publication Data
US 2013/0195202 A1 Aug. 1, 2013

Related U.S. Application Data

(60) Provisional application No. 61/388,232, filed on Sep. 30, 2010.

(51) Int. Cl.
*H04N 7/50* (2006.01)
*H04N 19/30* (2014.01)
(Continued)

(52) U.S. Cl.
CPC ....... *H04N 19/00424* (2013.01); *H04N 19/119* (2014.11); *H04N 19/176* (2014.11); *H04N 19/30* (2014.11); *H04N 19/463* (2014.11); *H04N 19/61* (2014.11); *H04N 19/96* (2014.11)

(58) Field of Classification Search
CPC ... H04N 19/176; H04N 19/96; H04N 19/119; H04N 19/61; H04N 19/463; H04N 19/30; H04N 19/00424; H04N 19/46; H04N 19/152; H04N 19/184; H04N 19/82; H04N 19/70; H04N 19/12; H04N 19/157; H04N 19/117; H04N 19/85; H04N 19/132; H04N 19/00212; H04N 19/42; H04N 19/91; H04N 19/436; H04N 19/147; H04N 19/122; H04N 19/63; H04N 19/146; H04N 19/124; H04N 19/53; H04N 19/54; H04N 5/145; H04N 19/19; H04N 19/14; H04N 19/186; H04N 7/12; G06T 9/007; G06T 7/20; H04B 1/66
See application file for complete search history.

(56) References Cited

U.S. PATENT DOCUMENTS 4,947,447 A * 8/1990 Miyaoka .................. G06T 9/40
375/E7.201
5,446,806 A * 8/1995 Ran et al. ...................... 382/240
(Continued)

FOREIGN PATENT DOCUMENTS

EP 0 961 494 B1 4/2004
EP 1 771 008 A2 4/2007
(Continued)

OTHER PUBLICATIONS

"The Quadtree and Related Hierarchical Data Structures", by Hanan Samet, Computing Surveys, vol. 16, No. 2, Jun. 1984, pp. 187 to 260.*

(Continued)

*Primary Examiner* — Dramos I Kalapodas
(74) *Attorney, Agent, or Firm* — Sughrue Mion, PLLC

(57) ABSTRACT

Provided is a video encoding method and an apparatus for performing the same, and a video decoding method and an apparatus for performing the same. The video encoding method for encoding symbols having a hierarchical structure includes: encoding a picture of a video based on data units having a hierarchical structure; determining symbols of the encoded picture based on the data units having the hierarchical structure; determining an encoding method of the symbols based on characteristics of symbols, which are determined based on the data units having the hierarchical structure; and encoding and outputting the symbols according to the determined encoding method.

17 Claims, 23 Drawing Sheets

(51) Int. Cl.
*H04N 19/176* (2014.01)
*H04N 19/119* (2014.01)
*H04N 19/61* (2014.01)
*H04N 19/96* (2014.01)
*H04N 19/463* (2014.01)
*G06K 9/36* (2006.01)
*G06K 9/46* (2006.01)

(56) References Cited

U.S. PATENT DOCUMENTS

| | | | |
|---|---|---|---|
| 5,706,059 A * | 1/1998 | Ran | H04N 19/533 348/699 |
| 5,768,434 A * | 6/1998 | Ran | H04N 11/042 375/E7.136 |
| 6,005,981 A * | 12/1999 | Ng et al. | 382/240 |
| 6,084,908 A * | 7/2000 | Chiang | G06T 7/20 348/E5.066 |
| 6,356,665 B1 * | 3/2002 | Lei | G06T 9/40 341/79 |
| 8,514,107 B2 * | 8/2013 | Chen et al. | 341/50 |
| 2001/0046326 A1 | 11/2001 | Felts et al. | |
| 2002/0009233 A1 | 1/2002 | Pesquet-Popescu | |
| 2002/0138517 A1 | 9/2002 | Mory et al. | |
| 2003/0049020 A1 | 3/2003 | Takahashi et al. | |
| 2003/0202602 A1 | 10/2003 | Apostolopoulos et al. | |
| 2004/0170335 A1 * | 9/2004 | Pearlman | G06T 9/40 382/240 |
| 2005/0084015 A1 | 4/2005 | Han et al. | |
| 2006/0233240 A1 | 10/2006 | Cha et al. | |
| 2007/0291849 A1 | 12/2007 | Lainema | |
| 2008/0063114 A1 | 3/2008 | Joung et al. | |
| 2009/0219988 A1 | 9/2009 | Cammas et al. | |
| 2010/0046626 A1 | 2/2010 | Tu et al. | |
| 2010/0158115 A1 * | 6/2010 | Jang | H04N 19/176 375/240.12 |
| 2010/0310186 A1 * | 12/2010 | Liu et al. | H04N 9/176 382/239 |
| 2011/0158323 A1 * | 6/2011 | Chen et al. | 375/240.24 |
| 2012/0082222 A1 * | 4/2012 | Wang et al. | 375/240.12 |
| 2012/0169519 A1 * | 7/2012 | Ugur | H04N 19/91 341/55 |
| 2015/0010243 A1 * | 1/2015 | Yie et al. | 382/238 |

FOREIGN PATENT DOCUMENTS

| | | |
|---|---|---|
| EP | 1 771 008 A3 | 1/2009 |
| EP | 2 547 107 A2 | 1/2013 |
| JP | 2003530036 A | 10/2003 |
| KR | 19940025347 A | 11/1994 |
| KR | 20020026254 A | 4/2002 |
| KR | 1020060053269 A | 5/2006 |
| RU | 2285354 C2 | 10/2006 |
| RU | 2329616 C2 | 7/2008 |
| RU | 2350040 C1 | 3/2009 |
| RU | 2008129892 A | 2/2010 |
| WO | 97/17797 A2 | 5/1997 |
| WO | 97/17797 A3 | 5/1997 |
| WO | 0176255 A1 | 10/2001 |
| WO | 2004/104930 A2 | 12/2004 |
| WO | 2004/104930 A3 | 12/2004 |
| WO | 2010/039728 A2 | 4/2010 |
| WO | 2010/039728 A3 | 4/2010 |

OTHER PUBLICATIONS

"A New, Fast, and Efficient Image CODEC Based on Set Partitioning in Hierarchical Trees", by Amir Said et al., 1051-8215/96, © 1996 IEEE.*
"Status Report on Image Information Systems and Image Data Base Technology", by M.J. Fiebig, © Commonwealth of Australia, SRL-0047-TM, Dec. 1989.*
"t-Statistic Based Correlation and Heterogeneity Robust Reference", by Rustam Ibragimov et al., © 2010 American Statistical Association Journal of Business & Economic Statistics, DOI: 10.1198/jbes.2009.08046.*
Communication dated Jun. 12, 2014 issued by the Australian IP Government in counterpart Application No. 2011308154.
Communication dated Oct. 9, 2014, issued by the Russian Patent Office in counterpart Russian Application No. 2013119943.
International Search Report (PCT/ISA/220 & PCT/ISA/210) dated Apr. 10, 2012 from the International Searching Authority in counterpart application No. PCT/KR/2011/007218.
Written Opinion (PCT/ISA/237) dated Apr. 10, 2012 from the International Searching Authority in counterpart application No. PCT/KR/2011/007218.
Morvan et al., "Novel Coding Technique for Depth Images using Quadtree Decomposition and Plane Approximation", XP008080554, Proc. of SPIE vol. 5960 596031-1, 8 pages, 2005.
Communication from the European Patent Office issued Jan. 26, 2016, in a counterpart European Application No. 11829610.2.

* cited by examiner

FIG. 3
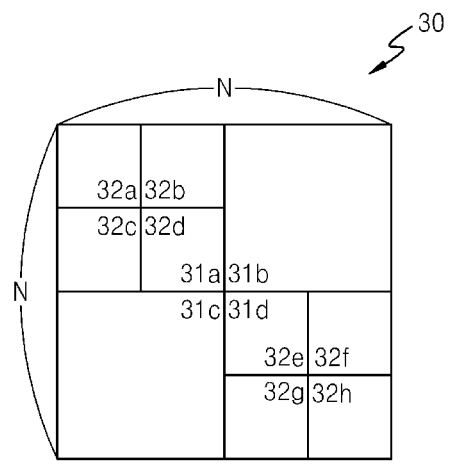
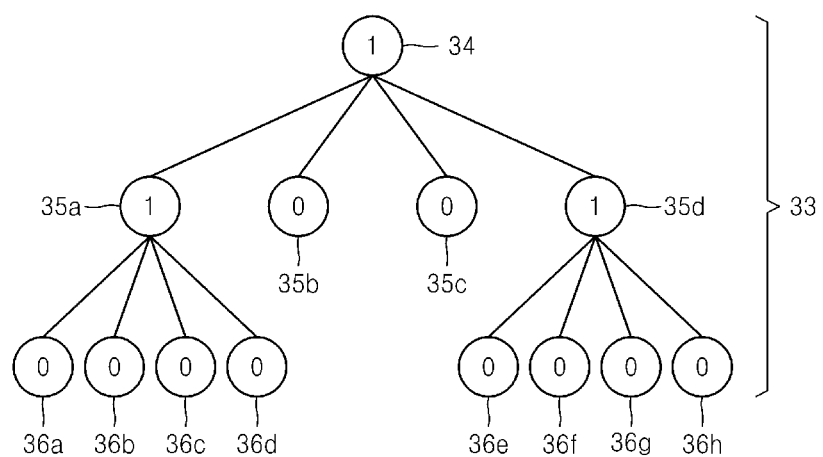

FIG. 19
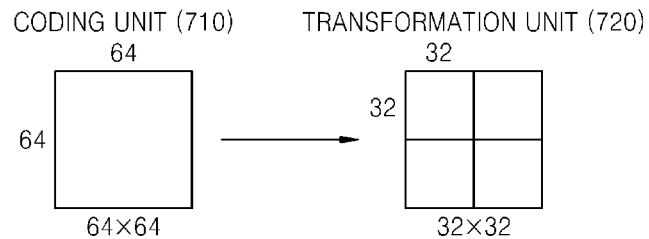
FIG. 20
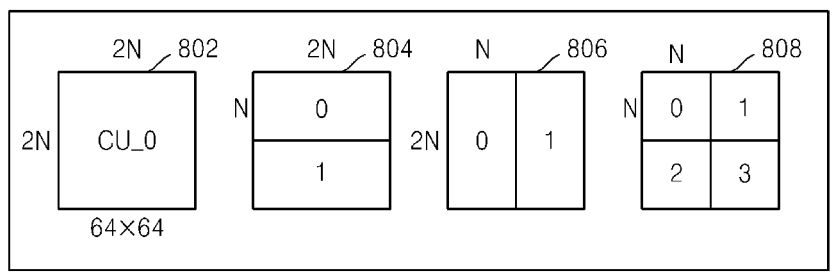
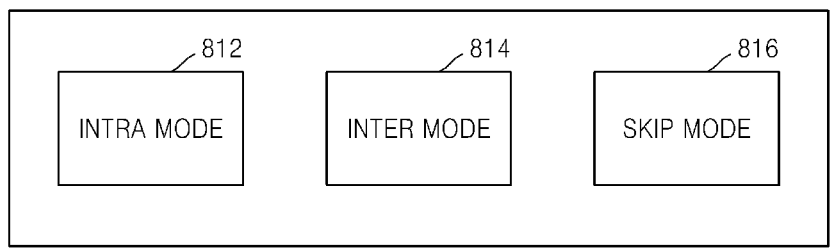
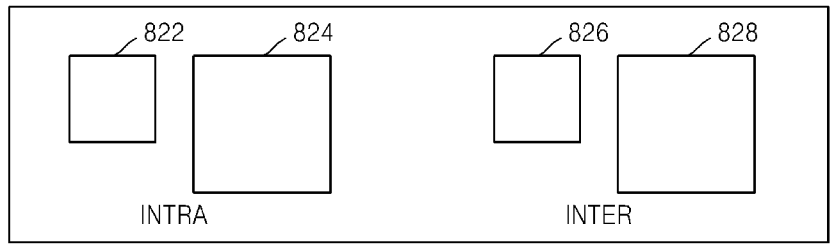

CODING UNITS (1010)

VIDEO ENCODING METHOD FOR ENCODING HIERARCHICAL-STRUCTURE SYMBOLS AND A DEVICE THEREFOR, AND VIDEO DECODING METHOD FOR DECODING HIERARCHICAL-STRUCTURE SYMBOLS AND A DEVICE THEREFOR

CROSS-REFERENCE TO RELATED APPLICATIONS

This application is a National Stage application under 35 U.S.C. §371 of International Application No. PCT/KR2011/007218, filed on Sep. 30, 2011, and claims the benefit of U.S. Provisional Application No. 61/388,232, filed on Sep. 30, 2010 in the United States Patent and Trademark Office, the disclosures of which are incorporated herein by reference in their entireties.

BACKGROUND

1. Field

Apparatuses and methods consistent with exemplary embodiments relate to encoding a symbol of a video codec.

2. Description of the Related Art

As hardware for reproducing and storing high resolution or high quality video content is being developed and supplied, a demand for a video codec for effectively encoding or decoding the high resolution or high quality video content is increasing. In a related art video codec, a video is encoded according to a limited encoding method based on a macroblock having a predetermined size. Also, according to the related art video codec, encoding information used to decode a video is encoded and transferred.

SUMMARY

Apparatuses and methods consistent with exemplary embodiments relate to encoding and decoding a video, wherein symbols having a hierarchical structure, which are determined with respect to data units having a hierarchical structure, are encoded and decoded.

According to an aspect of an exemplary embodiment, there is provided a video encoding method for encoding symbols having a hierarchical structure, the video encoding method including: encoding a picture of a video based on data units having a hierarchical structure; determining symbols of the encoded picture based on the data units having the hierarchical structure; determining an encoding method of the symbols based on characteristics of symbols, which are determined based on the data units having the hierarchical structure; and encoding and outputting the symbols according to the determined encoding method.

The determining of the encoding method may include selectively determining a symbol encoding method with respect to the data units having the hierarchical structure, from among a symbol hierarchical encoding mode, wherein the determined symbols are encoded according to the data units having the hierarchical structure, and a lowermost level encoding mode, wherein symbols of data units in a lowermost level from among the data units having the hierarchical structure are encoded, based on encoding characteristics of the data units used to encode the symbols.

The selectively determining of the encoding method may include selectively determining a symbol encoding method from among a homogeneous symbol group encoding mode, wherein homogeneous symbols determined according to the data units having the hierarchical structure are grouped and encoded based on a correlation between symbol values of the homogeneous symbols, and a homogeneous symbol individual encoding mode, wherein the homogeneous symbols are individually encoded, based on encoding characteristics the data units used to encode the symbols with respect to the data units.

The determining of the encoding method may include selectively determining a symbol encoding method from among a heterogeneous symbol group encoding mode, wherein heterogeneous symbols determined according to the data units having the hierarchical structure are grouped and encoded based on a correlation of heterogeneous symbols, and a heterogeneous symbol individual encoding mode, wherein the heterogeneous symbols are individually encoded.

The determining of the encoding method may include selectively determining a symbol encoding method from among a symbol reverse encoding mode, wherein symbol values of symbols of data units in a lowermost level are reversed and encoded, and a non-reverse encoding mode, wherein symbol values of symbols of data units in a lowermost level are encoded without being reversed, based on a ratio of symbol values that are 0 from among symbol values of the data units having the hierarchical structure.

According to an aspect of another exemplary embodiment, there is provided a video decoding method for decoding symbols having a hierarchical structure, the video decoding method including: receiving a bitstream including an encoded picture of a video; extracting the encoded picture and symbols determined based on data units having a hierarchical structure from the bitstream by parsing the bitstream; and decoding the encoded picture by using the symbols after determining a decoding method of the symbols based on characteristics of the symbols determined based on the data units having the hierarchical structure, and decoding the symbols according to the decoding method.

The decoding may include selectively determining a symbol decoding method from among a homogeneous symbol group decoding mode, wherein homogeneous symbols determined according to the data units having the hierarchical structure are grouped and encoded based on a correlation between symbol values of the homogeneous symbols, and a homogeneous symbol individual decoding mode, wherein the homogeneous symbols are individually encoded, based on encoding characteristics of the data units used to decode the symbols with respect to the data units.

The decoding may include selectively determining a symbol decoding method from among a heterogeneous symbol group decoding mode, wherein heterogeneous symbols determined according to the data units having the hierarchical structure are grouped and decoded, and a heterogeneous symbol individual decoding mode, wherein the heterogeneous symbols are individually decoded, based on a correlation of heterogeneous symbols, The decoding may include selectively determining a symbol decoding method from among a symbol reverse decoding mode, wherein symbol values of symbols of data units in a lowermost level are reversed and decoded, and a non-reverse decoding mode, wherein symbol values of symbols of data units in a lowermost level are decoded without being reversed, based on a ratio of symbol values that are 0 from among symbol values of the data units having the hierarchical structure.

According to an aspect of another exemplary embodiment, there is provided a video encoding apparatus for encoding symbols having a hierarchical structure, the video encoding apparatus including: a picture hierarchical encoder for encoding a picture of a video based on data units having a hierarchical structure; and a hierarchical symbol encoder for determining symbols of the encoded picture based on the data units having the hierarchical structure, determining an encoding method of the symbols based on characteristics of symbols, which are determined based on the data units having the hierarchical structure, and encoding and outputting the symbols according to the determined encoding method.

According to an aspect of another exemplary embodiment, there is provided a video decoding apparatus for decoding symbols having a hierarchical structure, the video decoding apparatus including: a hierarchical symbol and data extractor for receiving a bitstream including an encoded picture of a video, and extracting the encoded picture and symbols determined based on data units having a hierarchical structure from the bitstream by parsing the bitstream; and a hierarchical picture decoder for decoding the encoded picture by using the symbols after determining a decoding method of the symbols based on characteristics of the symbols determined based on the data units having the hierarchical structure, and decoding the symbols according to the decoding method.

According to an aspect of another exemplary embodiment, there is provided a computer-readable recording medium having recorded thereon a program for executing the video encoding method.

According to an aspect of another exemplary embodiment, there is provided a computer-readable recording medium having recorded thereon a program for executing the video decoding method.

According to aspects of one or more exemplary embodiments, symbols are efficiently encoded since a suitable symbol encoding method is determined according to symbol characteristics of encoding symbols having a tree structure, the encoding symbols determined during encoding processes of coding units having a tree structure and transformation units having a tree structure. Also, symbols may be efficiently decoded even when only some of encoding symbols having a tree structure, the encoding symbols determined during encoding processes of coding units having a tree structure and transformation units having a tree structure, are received, since remaining symbols may be restored according to a symbol decoding method.

DESCRIPTION OF THE DRAWINGS

FIG. 3 illustrates transformation units having a hierarchical structure, and corresponding transformation unit split information having a hierarchical structure, according to an exemplary embodiment;

FIG. 19 is a diagram for describing a relationship between a coding unit and transformation units, according to an exemplary embodiment;

FIG. 20 is a diagram for describing encoding information of coding units corresponding to a coded depth, according to an exemplary embodiment;

DETAILED DESCRIPTION OF EXEMPLARY EMBODIMENTS

The description below and the attached drawings are provided to gain an understanding of operations according to exemplary embodiments. Descriptions of elements or operations that may be easily implemented by one of ordinary skill in the art may be omitted.

The description and the drawings are not provided for limitation, and the scope of the inventive concept should be defined by the appended claims. The meaning of the terms used in the present specification and claims should be construed as meanings and concepts not departing from the spirit and scope of the inventive concept based on the principle that the inventor is capable of defining concepts of terms in order to describe exemplary embodiments in the most appropriate way.

Hereinafter, exemplary embodiments will be described with reference to the attached drawings.

Hereinafter, an 'image' used in various exemplary embodiments may not only denote a still image, but may also denote a moving image, such as a video.

When various operations are performed on data related to an image, the data related to the image may be divided into data groups, and the same operation may be performed on data included in the same data group. Hereinafter, a data group formed according to a predetermined standard is referred to as a 'data unit'. Also, an operation performed according to 'data units' is performed by using data included in a corresponding data unit.

Hereinafter, video encoding and decoding, wherein symbols having a hierarchical structure are encoded and decoded, according to exemplary embodiments, will be described with reference to FIGS. 1 through 14. Then, video encoding and decoding, wherein symbols having a tree structure are encoded and decoded based on coding units having a tree structure and transformation units having a tree structure, according to exemplary embodiments, will be described with reference to FIGS. 15 through 27.

A video encoding apparatus and video encoding method for encoding symbols having a hierarchical structure, and a video decoding apparatus and video decoding method for decoding symbols having a hierarchical structure, according to exemplary embodiments, will now be described with reference to FIGS. 1 through 14.

Figure 1:
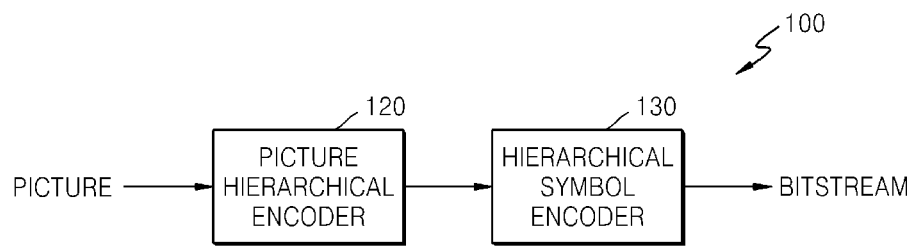
FIG. 1 is a block diagram of a video encoding apparatus for encoding symbols having a hierarchical structure, according to an exemplary embodiment.

FIG. 1 is a block diagram of a video encoding apparatus 100 for encoding symbols having a hierarchical structure, according to an exemplary embodiment.

The video encoding apparatus 100 includes a picture hierarchical encoder 120 and a hierarchical symbol encoder 130. Operations of the picture hierarchical encoder 120 and the hierarchical symbol encoder 130 of the video encoding apparatus 100 may be cooperatively controlled by a video encoding processor, a central processor, and a graphic processor.

The video encoding apparatus 100 may perform encoding according to data units by splitting a current picture into data units having a predetermined size, in order to encode the current picture in an input video.

For example, the current picture includes pixels in a spatial domain. In order to encode spatially adjacent pixels in the current picture together, the current picture may be split into pixel groups having a predetermined size such that adjacent pixels within a predetermined range form one pixel group. Then, the encoding may be performed on the current picture via a series of encoding operations performed on the pixels in the pixel groups having the predetermined size.

Since initial data to be encoded in a picture is a pixel value in a spatial domain, each of the pixel groups having the predetermined size may be used as a data unit to be encoded. Also, transformation coefficients in a transformation domain are generated by performing transformation for video encoding on the pixel values of the pixel groups in the spatial domain, and at this time, the transformation coefficients also maintain coefficient groups having the same size as the pixel groups in the spatial domain. Accordingly, the coefficient groups of the transformation coefficients may also be used as data units for encoding the current picture.

Accordingly, throughout the spatial domain and the transformation domain, the data groups having the predetermined size may be used as the data units. Here, a size of the data unit may be defined by a number of pieces of data included in the data unit. For example, a number of pixels in the spatial domain or a number of transformation coefficients in the transformation domain may indicate the size of the data unit.

An encoding method or encoding characteristics of a current data unit may be determined according to data units in any one of data levels from among a data unit, slice, picture, and picture sequence that are to be currently encoded in a video.

The video encoding apparatus 100 may perform encoding on the current picture by performing prediction encoding including inter prediction and intra prediction, transformation, quantization, and entropy encoding according to regions.

The picture hierarchical encoder 120 encodes a picture of a video based on data units having a hierarchical structure. In order to encode a predetermined region, data units in the predetermined region may be split from data units in an upper level to data units in a lower level so that the data units in one or more levels form a hierarchical structure. The picture hierarchical encoder 120 may encode the picture based on the data units having various sizes according to the hierarchical structure.

The hierarchical symbol encoder 130 determines symbols of the encoded picture output from the picture hierarchical encoder 120 based on the data units having the hierarchical structure. The hierarchical symbol encoder 130 may determine an encoding method of the symbols based on characteristics of the symbols determined based on the data units having the hierarchical structure. Accordingly, the hierarchical symbol encoder 130 may encode and output the symbols according to the determined encoding method. The hierarchical symbol encoder 130 may output symbol codes assigned to the symbols having a hierarchical structure according to the determined encoding method.

The hierarchical symbol encoder 130 may determine the symbols of the encoded picture according to the data units having the hierarchical structure. The symbol may include encoding information indicating an encoding mode and an encoding method determined and used while encoding the picture. For example, encoding information defined during a video encoding process, such as prediction mode information and prediction direction information of intra and inter prediction, structure information of data unit that is a base of data encoding, or encoding pattern information, may be included in the symbol.

Since the symbols are determined according to the data units having the hierarchical structure, the hierarchical symbol encoder 130 may also determine the symbols in the hierarchical structure. A pattern of a high correlation may be generated between homogeneous symbols of the data unit in a predetermined level, from among the symbols determined according to the hierarchical structure by the hierarchical symbol encoder 130. Also, a high correlation may be found between heterogeneous symbols determined according to the hierarchical structure by the hierarchical symbol encoder 130. Also, a predetermined pattern may be found throughout levels of the symbols determined according to the hierarchical structure by the hierarchical symbol encoder 130.

The hierarchical symbol encoder 130 may determine the encoding method of the symbols by considering such characteristics of symbols according to the hierarchical structure of the symbols.

For example, the hierarchical symbol encoder 130 may determine whether all of the symbols determined according to the data units having the hierarchical structure are to be determined according to the hierarchical structure.

For example, the hierarchical symbol encoder 130 may determine whether to group and encode homogeneous symbols based on the correlation between symbol values of the homogeneous symbols determined according to the data units having the hierarchical structure.

For example, the hierarchical symbol encoder 130 may determine whether to group and encode heterogeneous symbols based on the correlation between heterogeneous symbols determined according to the data units having the hierarchical structure.

For example, the hierarchical symbol encoder 130 may determine whether to reverse and encode symbol values with respect to the data units in a predetermined level, based on a ratio of a predetermined symbol value in the data units having the hierarchical structure.

For example, the hierarchical symbol encoder 130 may selectively determine a symbol encoding method from among a symbol hierarchical encoding mode, wherein the symbols determined according to the data units having the hierarchical structure are all encoded according to the data units having the hierarchical structure, and a lowermost level encoding mode, wherein symbols of data units in a lowermost level, (e.g. a leaf node in symbols having a tree-structure) from among the data units having the hierarchical structure are encoded.

When the symbols are encoded according to the symbol hierarchical encoding mode, the hierarchical symbol encoder 130 may encode and output the symbols determined according to the data units having the hierarchical structure, according to the data units having the hierarchical structure. On the other hand, when the symbols are encoded according to the lowermost level encoding mode, the hierarchical symbol encoder 130 may encode and output only the symbols of the data units in the predetermined level from among the data units having the hierarchical structure.

The hierarchical symbol encoder 130 may determine a symbol encoding method from among the symbol hierarchical encoding mode and the lowermost level encoding mode, based on encoding characteristics of the data units of the symbols. Here, the encoding characteristics considered to determine the symbol encoding method may include at least one of a prediction mode and a color component of the data units of the symbols.

Alternatively, the hierarchical symbol encoder 130 may selectively determine a symbol encoding method from among a homogeneous symbol group encoding mode, wherein homogeneous symbols are grouped and encoded, and a homogeneous symbol individual encoding mode, wherein homogeneous symbols are individually encoded, based on the correlation of symbol values of the homogeneous symbols determined according to the data units having the hierarchical structure.

Here, the correlation of the symbol values of the homogeneous symbols considered to determine the symbol encoding method may include a shape and frequency of patterns formed between the symbol values.

When the symbols are encoded according to the homogeneous symbol group encoding mode, the hierarchical symbol encoder 130 may determine a symbol code table including symbol codes assigned according to patterns of the symbol values. The symbol code table may include symbol codes assigned according to patterns based on frequencies of the patterns.

The hierarchical symbol encoder 130 may output symbol codes of the homogeneous symbols of the data units based on the symbol code table and the patterns of the homogeneous symbols. In other words, the symbol codes assigned to the patterns of the symbol values of the homogeneous symbols may be output based on the symbol code table.

The hierarchical symbol encoder 130 may determine whether to encode at least one of symbols from among skip mode information, split information of a data unit for encoding, split information of a data unit for transformation, and encoding pattern information, according to the homogeneous symbol group encoding mode.

In other words, the hierarchical symbol encoder 130 may determine whether to encode symbols according to the homogeneous symbol group encoding mode, based on a correlation between symbol values of skip mode information.

The hierarchical symbol encoder 130 may determine whether to encode symbols according to the homogeneous symbol group encoding mode, based on a correlation between symbol values of coding unit split information.

The hierarchical symbol encoder 130 may determine whether to encode symbols according to the homogeneous symbol group encoding mode, based on a correlation between symbol values of transformation unit split information.

The hierarchical symbol encoder 130 may determine whether to encode symbols according to the homogeneous symbol group encoding mode, based on a correlation between symbol values of transformation unit encoding pattern information.

When the symbols are encoded according to the homogeneous symbol individual encoding mode, the hierarchical symbol encoder 130 may individually encode the homogeneous symbols of the data units having the hierarchical structure, regardless of the correlation between the symbol values of the homogeneous symbols.

The hierarchical symbol encoder 130 may determine a symbol encoding method from among the homogeneous symbol group encoding mode and an independent encoding mode, based on the encoding characteristics of the data units of the symbols. For example, the hierarchical symbol encoder 130 may selectively determine a symbol encoding method based on the encoding characteristics of the data units including at least one of prediction mode information, a slice type, and a color component of the data units of the symbols, a split level of a data unit for encoding, and a split level of a data unit for transformation.

The split level of the data unit for encoding indicates a split number of times from a maximum coding unit to a current coding unit, and may be referred to as a coded depth. The split level of the data for transformation indicates a split number of times from a maximum transformation unit to a current transformation unit, and may be referred to as a transformation depth.

Alternatively, the hierarchical symbol encoder 130 may selectively determine a symbol encoding method from among a heterogeneous symbol group encoding mode, wherein heterogeneous symbols are grouped and encoded, and a heterogeneous symbol individual encoding mode, wherein heterogeneous symbols are individually encoded, based on a correlation of heterogeneous symbols determined according to the data units having the hierarchical structure.

During an encoding process based on the data units having the hierarchical structure, a symbol encoding method from among the heterogeneous symbol group encoding mode and the heterogeneous symbol individual encoding mode may be selectively determined based on the correlation of the heterogeneous symbols including at least one of a correlation of functions indicated by the heterogeneous symbols, dependent encoding between the heterogeneous symbols, and sequential encoding between the heterogeneous symbols.

For example, when the symbols are encoded according to the heterogeneous symbol group encoding mode, the hierarchical symbol encoder 130 may determine a context shared by the heterogeneous symbols based on the correlation of the functions indicated by the heterogeneous symbols. The hierarchical symbol encoder 130 may encode and output each of the heterogeneous symbols based on the shared context.

For example, when the symbols are encoded according to the heterogeneous symbol group encoding mode, the hierarchical symbol encoder 130 may assign symbol codes to combinations of symbol values of the heterogeneous symbols, based on a probability distribution of the combinations of the symbol values generated between the heterogeneous symbols that are interdependently determined. The hierarchical symbol encoder 130 may output the symbol codes assigned with respect to the combinations of the symbol values of the heterogeneous symbols.

For example, when the symbols are encoded according to the heterogeneous symbol group encoding mode, the hierarchical symbol encoder 130 may assign symbol codes to combinations of symbol values of heterogeneous symbols generated between heterogeneous symbols that are sequentially determined. The hierarchical symbol encoder 130 may output the symbol codes assigned with respect to the combinations of the symbol values of the heterogeneous symbols.

For example, the hierarchical symbol encoder 130 may determine whether to encode a combination of coding unit split information and transformation unit split information according to the heterogeneous group encoding mode, based on a correlation between the coding unit split information and the transformation unit split information.

For example, the hierarchical symbol encoder 130 may determine whether to encode a combination of transformation unit split information and encoding pattern information according to the heterogeneous group encoding mode, based on a correlation between the transformation unit split information and the encoding pattern information.

For example, the hierarchical symbol encoder 130 may determine whether to encode a combination of prediction mode information and prediction method information according to the heterogeneous group encoding mode, based on a correlation between the prediction mode information and the prediction method information.

For example, the hierarchical symbol encoder 130 may determine whether to encode a combination of coding unit split information and skip information according to the heterogeneous group encoding mode, based on a correlation between the coding unit split information and the skip information.

For example, the hierarchical symbol encoder 130 may determine whether to encode a combination of encoding pattern information according to color components according to the heterogeneous group encoding mode, based on a correlation between the encoding pattern information according to two or more color components. The encoding pattern information according to the color components may include luma component encoding pattern information, chroma component encoding pattern information, first chroma component encoding pattern information, and second chroma component encoding pattern information. For example, the hierarchical symbol encoder 130 may determine whether to encode a combination of the luma component encoding pattern information and the chroma component encoding pattern information, or a combination of any one of the luma component encoding pattern information, the first chroma component encoding pattern information, and the second chroma component encoding pattern information, according to the heterogeneous symbol group encoding mode.

For example, the hierarchical symbol encoder 130 may determine whether to encode a combination of encoding pattern information according to color components of coding units and transformation unit split information according to the heterogeneous group encoding mode, based on a correlation between the encoding pattern information according to two or more color components and the transformation unit split information. For example, the hierarchical symbol encoder 130 may determine whether to encode a combination of the luma component encoding pattern information, the first chroma component encoding pattern information, the second chroma component encoding pattern information, and the transformation unit split information, according to the heterogeneous symbol group encoding mode.

When the symbols are encoded according to the heterogeneous symbol individual encoding mode, the hierarchical symbol encoder 130 may individually encode the heterogeneous symbols of the data units having the hierarchical structure, regardless of the correlation between the heterogeneous symbols.

Alternatively, the hierarchical symbol encoder 130 may selectively determine a symbol encoding method from among a symbol reverse encoding mode, wherein symbol values of symbols of data units in a lowermost level are reversed and encoded, and a non-reverse encoding mode, wherein symbol values of symbols of data units are encoded without being reversed, based on a ratio of symbol values that are 0 from among the symbol values of data units having the hierarchical structure.

For example, when the symbols are encoded according to the symbol reverse encoding mode, the hierarchical symbol encoder 130 may reverse and encode the symbol values of the data units in the lowermost level if a ratio of the symbol values that are 0 is lower than that of symbol values that are 1 in the symbol values. Similarly, when a symbol distribution of the symbol values is dense, the hierarchical symbol encoder 130 may reverse and encode the symbol values of the data units in the lowermost level.

When the symbols are encoded according to the non-reverse encoding mode, the hierarchical symbol encoder 130 may encode the symbols without reversing the symbol values, regardless of the ratio of the symbol values that are 0 in the symbol values.

The hierarchical symbol encoder 130 may selectively determine a symbol encoding method from among the symbol reverse encoding mode and the non-reverse encoding mode based on encoding characteristics of the data units including at least one of prediction mode information of the data units of the symbols, a slice type, a color component, a coded depth, and a transformation depth.

The hierarchical symbol encoder 130 may determine a symbol encoding method according to each data section from among a slice of a video, a picture, a sequence, and a maximum coding unit. The video encoding apparatus 100 may encode and output symbol encoding method information indicating the symbol encoding method according to the each data section.

The video encoding apparatus 100 may output a bitstream including the picture encoded with the symbols encoded by the hierarchical symbol encoder 130.

The data units having the hierarchical structure that is an encoding basis of the video encoding apparatus 100 may include coding units having a tree structure, transformation units having a tree structure, and prediction units and partitions of the coding units having the tree structure. Accordingly, the picture hierarchical encoder 120 may determine the coding units having the tree structure, the transformation units having the tree structure, and the prediction units and partitions of the coding units having the tree structure.

The picture hierarchical encoder 120 may split a picture into at least one maximum coding unit, and determine coding units having a coded depth to be output as an encoding result, from among deeper coding units having a hierarchical structure according to depths indicating a number of times the maximum coding unit is spatially split, according to the maximum coding unit. The coding units having the tree structure may include the coding units having the coded depths for generating the encoding result that is to be finally output. Also, in order to determine the coding units having the coded depths, the prediction units and partitions, which are data units for prediction encoding, may be determined, and the transformation units having the tree structure, which are data units for transformation, may be determined.

The picture hierarchical encoder 120 may determine the coding units having the coded depths according to deeper coding units, independently from adjacent deeper coding units, from among deeper coding units. The coding units having the tree structure may include coding units having coded depths that are hierarchical in a same region and are independent in different regions, in a maximum coding unit.

In this case, the hierarchical symbol encoder 130 may encode and output the picture encoded based on the coding units having the tree structure, and the symbols indicating information about the coded depths and encoding modes of the coding units having the tree structure, according to the at least one maximum coding unit.

Methods of determining the coding units having the tree structure, the transformation units having the tree structure, and prediction units and partitions will be described later with reference to FIGS. 15 through 27.

Figure 2:
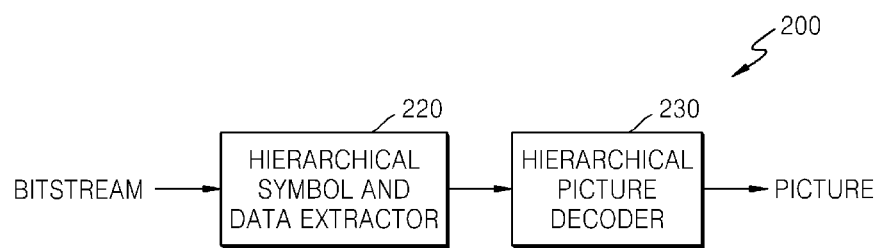
FIG. 2 is a block diagram of a video decoding apparatus for decoding symbols having a hierarchical structure, according to an exemplary embodiment.

FIG. 2 is a block diagram of a video decoding apparatus 200 for decoding a hierarchical-structured symbol, according to an exemplary embodiment.

The video decoding apparatus 200 includes a hierarchical symbol and data extractor 220 and a hierarchical picture decoder 230. Operations of the hierarchical symbol and data extractor 220 and the hierarchical picture decoder 230 of the video decoding apparatus 200 may be cooperatively controlled by a video decoding processor, a graphic processor, or a central processor.

In order to reconstruct an image from a bitstream, the video decoding apparatus 200 may decode encoded picture data of the bitstream via operations, such as entropy decoding, inverse-quantization, inverse-transformation, inter compensation, and intra prediction.

The hierarchical symbol and data extractor 220 receives and parses a bitstream about an encoded video. The hierarchical symbol and data extractor 220 may extract encoded data according to data units having a hierarchical structure with respect to a current picture, from the parsed bitstream.

Also, the hierarchical symbol and data extractor 220 may extract symbols determined in a hierarchical structure based on the data units having the hierarchical structure with respect to the current picture, from the bitstream. The hierarchical symbol and data extractor 220 may alternatively extract symbol codes assigned to the symbols determined in the hierarchical structure, from the bitstream.

The hierarchical symbol and data extractor 220 may transmit the encoded picture and the extracted symbols to the hierarchical picture decoder 230. The hierarchical picture decoder 230 may determine a decoding method of the symbols based on characteristics of the symbols determined based on the data units having the hierarchical structure. The hierarchical picture decoder 230 may decode the encoded picture by using encoding information by decoding the symbols according to the decoding method and reading the encoding information from the symbols.

The symbols may be encoded according to a symbol encoding method determined based on the characteristics of the symbols assigned to the data units having the hierarchical structure. The hierarchical symbol and data extractor 220 may extract encoding method information of the symbols according to each data section from among a slice of a video, a picture, a sequence, and a maximum coding unit, from the bitstream. Alternatively, symbol encoding method information may be pre-determined between the video encoding apparatus 100 and the video decoding apparatus 200.

The hierarchical picture decoder 230 may determine a symbol decoding method corresponding to a symbol encoding method used to encode a current symbol, and read information indicated by the current symbol by decoding the current symbol according to the symbol decoding method, based on the symbol encoding method information or pre-determined encoding method. When the symbol codes are received, the hierarchical picture decoder 230 may read and decode the symbols from the symbol codes according to a symbol decoding method.

For example, the hierarchical picture decoder 230 may determine whether to decode all of the symbols determined according to the data units having the hierarchical structure, according to the hierarchical structure.

For example, the hierarchical picture decoder 230 may determine whether to group and decode homogeneous symbols based on a correlation between symbol values of the homogeneous symbols determined according to the data units having the hierarchical structure.

For example, the hierarchical picture decoder 230 may determine whether to group and decode heterogeneous symbols based on a correlation between heterogeneous symbols determined according to the data units having the hierarchical structure.

For example, the hierarchical picture decoder 230 may determine whether to reverse and decode symbol values of data units in a predetermined level based on a ratio of a predetermined symbol value from among the data units having the hierarchical structure.

For example, the hierarchical picture decoder 230 may selectively determine a symbol decoding method from among a symbol hierarchical decoding mode, wherein the symbols determined according to the data units having the hierarchical structure are decoded according to the data units having the hierarchical structure, and a lowermost level decoding mode, wherein symbols of data units in a lowermost level are decoded.

When the symbols are decoded according to the symbol hierarchical decoding mode, the hierarchical picture decoder 230 may extract and read the symbols determined according to the data units having the hierarchical structure, according to the corresponding data units having the hierarchical structure. The symbols encoded based on the symbol hierarchical encoding mode may be decoded based on the symbol hierarchical decoding mode.

When the symbols are decoded according to the lowermost level decoding mode, the hierarchical picture decoder 230 may extract and read the symbols of the data units in the lowermost level, from among the data units having the hierarchical structure. Here, the hierarchical picture decoder 230 may read symbols of remaining data units based on the read symbols of the data units in the lowermost level. The symbols encoded based on the lowermost level encoding mode may be decoded based on the lowermost level decoding mode.

The hierarchical picture decoder 230 may determine a symbol decoding method from among the symbol hierarchical decoding mode and the lowermost level decoding mode, based on encoding characteristics of data units, which are to be used to decode the data units of the symbols. For example, the symbol decoding method may be determined based on the encoding characteristics including at least one of prediction mode information and color components of the data units of the symbols.

Alternatively, the hierarchical picture decoder 230 may selectively determine a symbol decoding method from among a homogeneous symbol group decoding mode, wherein homogeneous symbols are grouped and decoded, and a homogeneous symbol individual decoding mode, wherein homogeneous symbols are individually decoded. The symbols encoded according to the homogeneous symbol group encoding mode may be decoded according to the homogeneous group decoding mode. The symbols encoded according to the homogeneous symbol individual encoding mode may be decoded according to the homogeneous individual decoding mode.

The symbols decoded according to the homogeneous symbol group decoding mode may have a high correlation between symbol values of homogeneous symbols determined according to the data units having the hierarchical structure.

When a correlation between symbol values of homogeneous symbols includes shapes and frequencies of patterns formed between the symbol values, the hierarchical symbol and data extractor 220 may extract and transmit symbol codes of the homogeneous symbols from the bitstream to the hierarchical picture decoder 230.

When the symbols are decoded according to the homogeneous symbol group decoding mode, the hierarchical picture decoder 230 may obtain a symbol code table including symbol codes assigned to patterns, based on frequencies of the patterns between the symbol values of the homogeneous symbols. The symbol code table may be received through the bitstream or pre-determined between the video encoding apparatus 100 and the video decoding apparatus 200.

The hierarchical picture decoder 230 may read the homogeneous symbols and the patterns of the symbol values of the homogeneous symbols from the symbol codes of the homogeneous symbols extracted with respect to the data units, based on the symbol code table for decoding the symbols according to the homogeneous symbol group decoding mode.

The hierarchical picture decoder 230 may decode homogeneous symbols having a hierarchical structure, which are encoded based on the homogeneous symbol individual encoding mode, based on the homogeneous symbol individual decoding mode. When the symbols are decoded according to the homogeneous symbol individual decoding mode, the hierarchical picture decoder 230 may individually decode the homogeneous symbols having the hierarchical structure regardless of a correlation between the homogeneous symbols.

Types of symbols decoded according to the homogeneous symbol group decoding mode may include at least one of skip mode information, coding unit split information, transformation unit split information, and encoding pattern information.

The hierarchical picture decoder 230 may determine whether to decode skip mode information according to the homogeneous symbol group decoding mode, and decode the skip mode information according to a determined decoding mode, based on symbol codes of the skip mode information extracted from the bitstream.

The hierarchical picture decoder 230 may determine whether to decode coding unit split information according to the homogeneous symbol group decoding mode, and decode the coding unit split information according to a determined decoding mode, based on symbol codes of the coding unit split information extracted from the bitstream.

The hierarchical picture decoder 230 may determine whether to decode transformation unit split information according to the homogeneous symbol group decoding mode, and decode the transformation unit split information according to a determined decoding mode, based on symbol codes of the transformation unit split information extracted from the bitstream.

The hierarchical picture decoder 230 may determine whether to decode transformation unit encoding pattern information according to the homogeneous symbol group decoding mode, and decode the transformation unit encoding pattern information according to a determined decoding mode, based on symbol codes of the transformation unit encoding pattern information extracted from the bitstream.

Alternatively, the hierarchical picture decoder 230 may determine a symbol decoding method from among the homogeneous symbol group decoding mode and the homogeneous symbol individual decoding mode, based on encoding characteristics of the data units, which are to be used to decode the data units of the symbols. For example, the symbol decoding method may be selectively determined based on encoding characteristics including at least one of prediction mode information of the data units of the symbols, a slice type, a color component, a coded depth, and a transformation depth.

Alternatively, the hierarchical picture decoder 230 may selectively determine a symbol decoding method from among a heterogeneous symbol group decoding mode, wherein heterogeneous symbols having a hierarchical structure are grouped and decoded, and a heterogeneous symbol individual decoding mode, wherein heterogeneous symbols are individually decoded. Accordingly, the symbols encoded based on the heterogeneous symbol group encoding mode may be decoded based on the heterogeneous symbol group decoding mode. Also, the symbols encoded based on the heterogeneous symbol individual encoding mode may be decoded based on the heterogeneous symbol individual decoding mode.

Here, a high correlation may be generated between the heterogeneous symbols having the hierarchical structure, which are decoded according to the heterogeneous symbol group decoding mode. For example, the high correlation may be generated between the decoded heterogeneous symbols by including at least one of a correlation of functions indicated by the heterogeneous symbols during a decoding process based on the data units having the hierarchical structure, dependent decoding between the heterogeneous symbols, and sequential decoding between the heterogeneous symbols.

When the symbols are decoded according to the heterogeneous symbol group decoding mode, the hierarchical picture decoder 230 may read the heterogeneous symbols extracted with respect to the data units, based on a context determined to be shared based on the correlation of the functions indicated by the heterogeneous symbols. Here, the shared context may be pre-determined between the video encoding apparatus 100 and the video decoding apparatus 200.

When the symbols are encoded according to the heterogeneous symbol group encoding mode, symbol codes may be pre-assigned to combinations of symbol values of the heterogeneous symbols based on a probability distribution of the combinations generated between the heterogeneous symbols that are interdependently determined. Here, the hierarchical picture decoder 230 may decode the symbols by reading the symbol codes of the extracted symbols according to the heterogeneous symbol group decoding mode. The hierarchical picture decoder 230 may read each of the heterogeneous symbols by reading the combinations of the symbol values of the heterogeneous symbols, from the symbol codes of the heterogeneous symbols extracted from the bitstream. The read heterogeneous symbols are encoding information according to the data units having the hierarchical structure, and may be interdependently used while decoding the data units.

When the symbols are encoded according to the heterogeneous symbol group encoding mode, symbol codes may be assigned to the combinations of the symbol values generated between the heterogeneous symbols that are sequentially determined. Here, the hierarchical picture decoder 230 may decode the symbols according to the heterogeneous symbol group decoding mode. The hierarchical picture decoder 230 may read each of the heterogeneous symbols by reading the combinations of the symbol values of the heterogeneous symbols from the symbol codes of the heterogeneous symbols extracted from the bitstream. The read heterogeneous symbols are encoding information according to the data units having the hierarchical structure, and may be sequentially used while decoding the data units.

When the symbols are decoded according to the heterogeneous symbol individual decoding mode, the hierarchical picture decoder 230 may read the heterogeneous symbols extracted with respect to the data units having the hierarchical structure, regardless of the correlation between the heterogeneous symbols.

The hierarchical picture decoder 230 may restore each of the coding unit split information and the transformation unit split information by reading the combination of the coding unit split information and the transformation unit split information from the extracted symbol codes, according to the heterogeneous symbol group decoding mode.

The hierarchical picture decoder 230 may restore each of the transformation unit split information and the encoding pattern information by reading the combination of the transformation unit split information and the encoding pattern information from the extracted symbol codes, according to the heterogeneous symbol group decoding mode.

The hierarchical picture decoder 230 may restore each of a prediction mode of a coding unit and prediction method information by reading a combination of the prediction mode and the prediction method information from the extracted symbol codes, according to the heterogeneous symbol group decoding mode.

The hierarchical picture decoder 230 may restore each of the coding unit split information and the skip information by reading a combination of the coding unit split information and the skip information from the extracted symbol codes, according to the heterogeneous symbol group decoding mode.

The hierarchical picture decoder 230 may restore each of the encoding pattern information according to two or more color components by reading a combination of the encoding pattern information according to two or more color components from the extracted symbol codes, according to the heterogeneous symbol group decoding mode. For example, a combination of the luma component encoding pattern information and the chroma component encoding pattern information may be read and restored. For example, a combination of the luma component encoding pattern information, the first chroma component encoding pattern information, and the second chroma component encoding pattern information may be read and restored.

The hierarchical picture decoder 230 may restore each of the encoding pattern information according to color components and the transformation unit split information by reading a combination of the encoding pattern information according to two or more color components and the transformation unit split information from the extracted symbol codes, according to the heterogeneous symbol group decoding mode. For example, a combination of the luma component encoding pattern information, the first chroma component encoding pattern information, the second chroma component encoding pattern information, and the transformation unit split information may be read to restore the luma component encoding pattern information, the first chroma component encoding pattern information, the second chroma component encoding pattern information, and the transformation unit split information.

Alternatively, the hierarchical picture decoder 230 may selectively determine a symbol decoding method from among a symbol reverse decoding mode, wherein symbol values of symbols of data units in a lowermost level from among the data units having the hierarchical structure are reversed and decoded, and a non-reverse decoding mode, wherein symbol values of symbols of the data units are decoded without being reversed.

When the symbols are decoded according to the symbol reverse decoding mode, the hierarchical picture decoder 230 may reverse and decode the symbol values of the symbols of the data units in the lowermost level extracted from the symbols of the data units having the hierarchical structure. Also, the hierarchical picture decoder 230 may decode symbols of data units in an upper level of the lowermost level whose symbol values are reversed, based on the reversed symbol values. The symbols encoded based on the symbol reverse encoding mode may be decoded based on the symbol reverse decoding mode. The symbols decoded according to the symbol reverse decoding method may characterize in a ratio of symbol values that are 0 in the symbol values of the data units having the hierarchical structure.

The hierarchical picture decoder 230 may decode the symbols having the hierarchical structure encoded based on the non-reverse encoding mode, based on the non-reverse decoding mode. When the symbols are decoded according to the non-reverse decoding mode, the hierarchical picture decoder 230 may decode the extracted symbols having the hierarchical structure without having to reverse the symbol values.

The hierarchical picture decoder 230 may select a symbol decoding method from among the symbol reverse decoding mode and the non-reverse decoding mode, based on encoding characteristics of the data unit including at least one of prediction mode information, a slice type, a color component, a coded depth, and a transformation depth of the data units of the symbols.

As a result, the symbols decoded by the hierarchical picture decoder 230 according to a symbol decoding method may have a hierarchical structure according to the data units having the hierarchical structure.

The symbols having the hierarchical structure decoded by the hierarchical picture decoder 230 according to a symbol decoding method may have patterns of high correlations between homogeneous symbols of data units in a predetermined level.

Also, a high correlation may be found between predetermined heterogeneous symbols having a hierarchical structure decoded by the hierarchical picture decoder 230 according to a symbol decoding method.

Also, a predetermined pattern may be found throughout levels in symbols having a hierarchical structure decoded by the hierarchical picture decoder 230 according to a symbol decoding method.

The hierarchical picture decoder 230 may read information indicated by the symbols by decoding the symbols according to a symbol decoding method. For example, the hierarchical picture decoder 230 may read decoding information indicating an encoding mode and an encoding method, which are used while decoding a picture, from the symbols. For example, prediction mode information, prediction direction information, structure information of data units, and encoding pattern information may be read from the symbols.

Pixel values may be reconstructed and a current picture may be reconstructed by performing various decoding operations, such as entropy decoding, inverse quantization, inverse transformation, inter prediction and compensation, and intra prediction and compensation, on a decoded picture, according to any one of various decoding methods determined based on information about an encoding mode.

The data units having the hierarchical structure used as a decoding basis of the video decoding apparatus 200 may include coding units having a tree structure, transformation units having a tree structure, and prediction units and partitions of the coding units having the tree structure. Here, the hierarchical symbol and data extractor 220 may extract encoding data of the picture and symbols indicating a coded depth and an encoding mode, from the parsed bitstream, according to the coding units having the tree structure included in each maximum coding unit.

Accordingly, the hierarchical picture decoder 230 may read information about the coded depths and encoding modes of the coding units having the tree structure, the transformation units having the tree structure, and the partitions, by determining a symbol decoding method according to maximum coding units. The hierarchical picture decoder 230 may reconstruct a picture by decoding encoded data based on the coding units having the tree structure, the transformation units having the tree structure, and the partitions, by using the information about the coded depths and encoding modes.

Methods of determining the coding units having the tree structure, the transformation units having the tree structure, the prediction units, and the partitions will be described later with reference to FIGS. 15 through 27.

Hereinafter, symbol encoding methods for encoding symbols having a hierarchical structure, which are used by the video encoding apparatus 100, and symbol decoding methods for decoding symbols having a hierarchical structure, which are used by the video decoding apparatus 200, will be described with reference to FIGS. 3 through 12.

The video encoding apparatus 100 may encode the symbols by selecting a symbol encoding method form among the symbol hierarchical encoding mode and the lowermost level encoding mode. In other words, the video encoding apparatus 100 may encode all symbols determined according to the data units having the hierarchical structure according to the symbol hierarchical encoding mode, or encode only symbols of data units in a lowermost level according to the lowermost level encoding mode.

FIG. 3 illustrates transformation units having a hierarchical structure, and corresponding transformation unit split information having a hierarchical structure, according to an exemplary embodiment.

An example of the data units having the hierarchical structure includes transformation units having a hierarchical structure. A transformation unit 30 in level 0 that is an uppermost level is split into transformation units 31a through 31d in level 1 that is a level lower than the uppermost level, and the transformation units 31a and 31d are respectively split into transformation units 32a through 32d and 32e through 32h in level 2 that is a level lower than level 1.

Transformation unit split information indicating whether each transformation unit is split into transformation units in a lower level may be used as encoding information for indicating a hierarchical structure of a transformation unit. For example, when transformation unit split information of a current transformation unit is 1, the current transformation unit may be split into a lower level, and when transformation unit split information is 0, the current transformation unit may not be split.

As the transformation units 30, 31a through 31d, and 32a through 32h form a hierarchical structure, the transformation unit split information of the transformation units 30, 31a through 31d, and 32a through 32h may also form a hierarchical structure. In other words, transformation unit split information 33 includes transformation unit split information in level 0 that is an uppermost level, transformation unit split information 35a through 35d in level 1, and transformation unit split information 36a through 36h in level 2.

The transformation unit split information 34 in level 0 in the transformation unit split information 33 having the hierarchical structure denotes that the transformation unit 30 in level 0 is split. Similarly, the transformation unit split information 35a and 35d in level 1 respectively denote that the transformation units 31a and 31d in level 1 are split into the transformation units 32a through 32d and 32e through 32h in level 2.

The transformation unit split information 35b and 35c in level 1 may denote that the transformation units 31a and 31d in level 1 are transformation units in a lowermost level since they are no longer split. Similarly, the transformation unit split information 36a through 36h in level 2 may denote that the transformation units 32a through 32h in level 2 are transformation units in a lowermost level since they are no longer split.

Alternatively, transformation unit encoding pattern information indicating whether a transformation unit includes a transformation coefficient that is not 0 may be used as encoding information indicating an encoding method of transformation units having a hierarchical structure. For example, when the transformation unit encoding pattern information of a current transformation unit is 1, the current transformation unit may include a transformation coefficient that is not 0, and when the transformation unit encoding pattern information is 0, the current transformation unit may include only a transformation coefficient that is 0.

<Symbol Hierarchical Encoding and Decoding Modes and Lowermost Level Encoding and Decoding Modes>

The video decoding apparatus 200 may decode the symbols according to a symbol decoding method selectively determined from among the symbol hierarchical decoding mode and the lowermost level decoding mode. In other words, the video decoding apparatus 200 may read and decode all symbols determined according to the data units having the hierarchical structure from the extracted symbol codes based on the data units having the hierarchical structure according to the symbol hierarchical decoding mode, or may only read and decode symbols of the data units in the lowermost level extracted according to the lowermost level encoding mode and read and decode remaining symbols based on the decoded symbols of the data units in the lowermost level.

Figure 4:
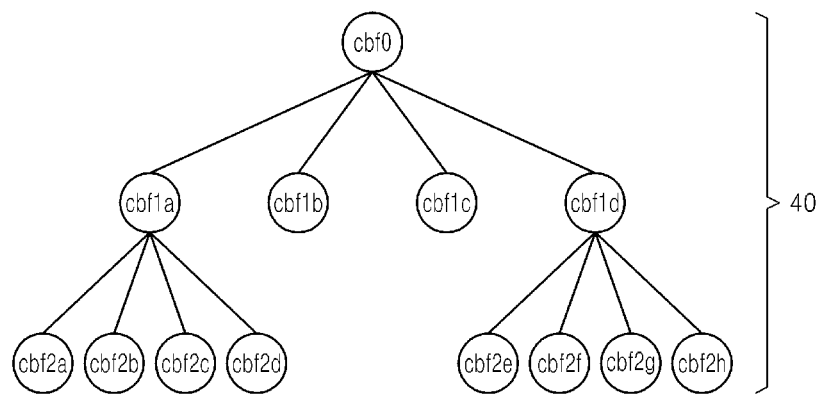
FIGS. 4 and 5 each illustrate a symbol hierarchical encoding mode and symbols encoded accordingly, according to exemplary embodiments.
Figure 5:
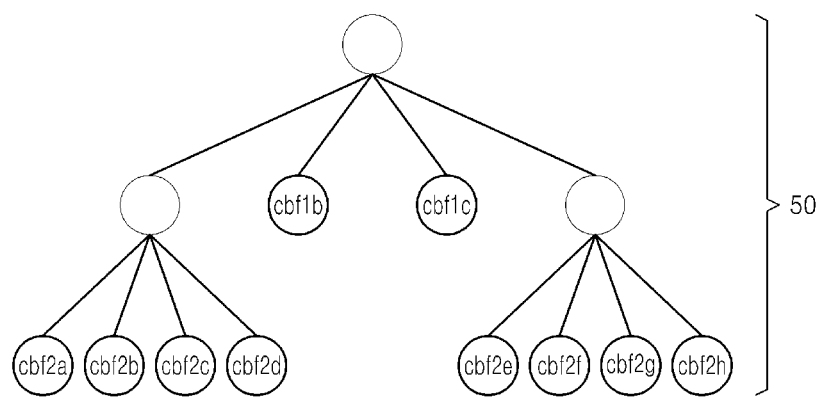

FIGS. 4 and 5 each illustrate a symbol hierarchical encoding mode and symbols encoded accordingly, according to exemplary embodiments.

In FIGS. 4 and 5, transformation units are shown as data units having a hierarchical structure, and transformation unit encoding pattern information is shown as a symbol. Symbol encoding and decoding modes of transformation unit encoding pattern information with respect to transformation units having a hierarchical structure will now be described with reference to FIGS. 4 and 5.

Based on the hierarchal structure of the transformation units 30, 31a through 31d, and 32a through 32h of FIG. 3, the transformation unit encoding pattern information may also have a hierarchical structure 40 with respect to the transformation units 30, 31a through 31d, and 32a through 32h.

The video encoding apparatus 100 may encode all of transformation unit encoding pattern information cbf, cbf1a through cbf1d, and cbf2a through cbf2h, about the transformation units 30, 31a through 31d, and 32a through 32h in all levels, according to the symbol hierarchical encoding mode.

The video encoding apparatus 100 may alternatively encode only transformation unit encoding pattern information cbf1b, cbf1c, and cbf2a through cbf2h about the transformation units 31b, 31c, and 32a through 32h in the lowermost level, according to the lowermost level encoding mode.

The video decoding apparatus 200 may reconstruct the transformation unit encoding pattern information having the hierarchical structure by extracting and reading all of the transformation unit encoding pattern information cbf, cbf1a through cbf1d, and cbf2a through cbf2h about the transformation units 30, 31a through 31d, and 32a through 32h in all levels, according to the symbol hierarchical decoding mode.

The video decoding apparatus 200 may only extract the transformation unit encoding pattern information cbf1b, cbf1c, and cbf2a through cbf2h about the transformation units 31b, 31c, and 32a through 32h in the lowermost level, according to the lowermost level decoding mode. Then, the video decoding apparatus 200 may reconstruct the transformation unit encoding pattern information having the hierarchical structure by reading the remaining transformation unit encoding pattern information cbf0 and cbf1a through cbf1d based on the extracted and read transformation unit encoding pattern information cbf1b, cbf1c, and cbf2a through cbf2h in the lowermost level.

A symbol encoding method may be determined from among the symbol hierarchical encoding mode and the lowermost level encoding mode, based on a ratio (symbol distribution) of symbols whose symbol values are 0 in the symbols having the hierarchical structure.

Figure 6:
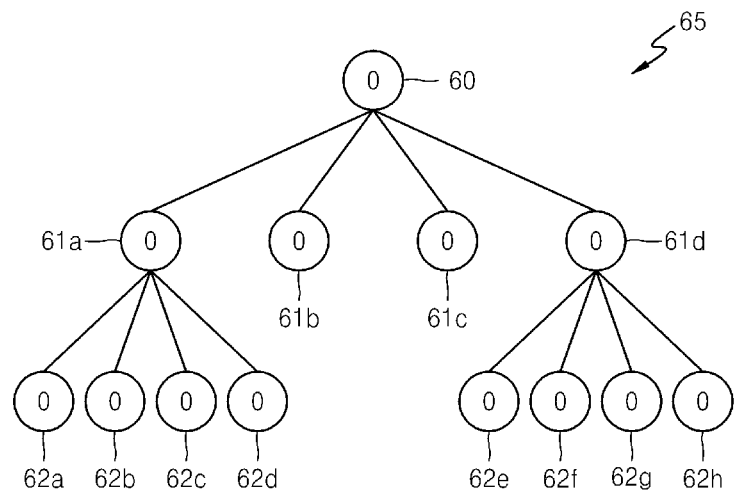
FIGS. 6 and 7 each illustrate an example of selecting one of a symbol hierarchical encoding mode and a lowermost level encoding mode, according to exemplary embodiments.
Figure 7:
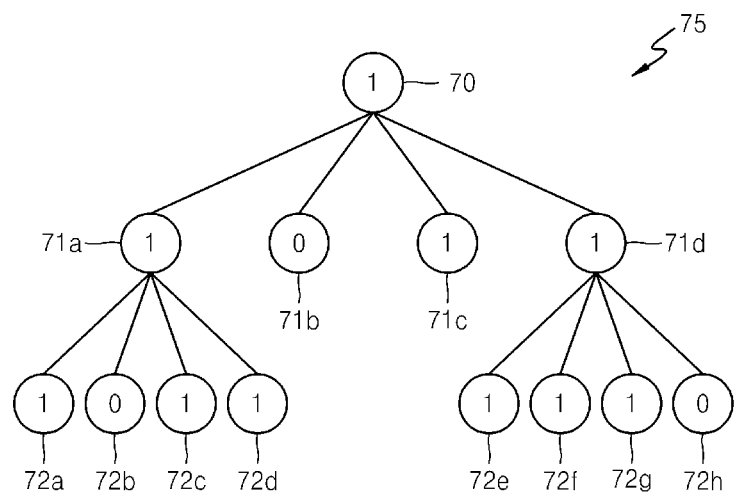

FIGS. 6 and 7 each illustrate an example of selecting one of the symbol hierarchical encoding mode and the lowermost level encoding mode, according to exemplary embodiments.

For example, a symbol encoding method may be determined from among the symbol hierarchical encoding mode and the lowermost level encoding mode, based on a ratio of symbols whose symbol values are 0 in symbols in lowermost levels from among symbols having a hierarchical structure.

According to transformation unit encoding pattern information 60 in level 0 from among transformation unit encoding pattern information 65 having a first hierarchical structure, it may be determined that a transformation unit in level 0 does not include a transformation coefficient that is not 0. Accordingly, it may be assumed that transformation units in levels 1 and 2, which are indicated by transformation unit encoding pattern information 61a through 61d and 62a through 62h in levels 1 and 2, also do not include transformation coefficients that are not 0.

Accordingly, when the transformation unit encoding pattern information 65 having the first hierarchical structure is encoded according to the symbol hierarchical encoding mode, only the transformation unit encoding pattern information 60 in level 0 may be encoded. Accordingly, a bit string of the transformation unit encoding pattern information 65 output according to the symbol hierarchical encoding mode may be '0'.

On the other hand, when the transformation unit encoding pattern information 65 having the first hierarchical structure is encoded according to the lowermost level encoding mode, the transformation unit encoding pattern information 61b, 61c, and 62a through 62h in the lowermost level may be encoded. An output order of transformation unit encoding pattern information may be in a vertical direction of up-and-down level rather than a horizontal direction of a same level in a hierarchical structure of the transformation unit encoding pattern information. Since the output order is according to an order of transformation unit encoding pattern information in the up-and-down level, a bit string of the transformation unit encoding pattern information 65 output according to the lowermost level encoding mode may be '0000 0 0 0000'.

Accordingly, when a symbol distribution of the transformation unit encoding pattern information 61b, 61c, and 62a through 62h is not dense like the transformation unit encoding pattern information 65 having the first hierarchical structure, i.e., when the ratio of symbols whose symbol values are 0 is high, encoding efficiency according to the symbol hierarchical encoding mode is relatively high compared to that according to the lowermost level encoding mode.

Also, when transformation unit encoding pattern information 75 having a second hierarchical structure is encoded according to the symbol hierarchical encoding mode, all of transformation unit encoding pattern information 70, 71a through 71d, and 72a through 72h in levels 0, 1, and 2 may be encoded. Accordingly, an output bit string of the transformation unit encoding pattern information 75 encoded according to the symbol hierarchical encoding mode may be '1 1 1011 0 1 1 1110'.

On the other hand, when the transformation unit encoding pattern information 75 having the second hierarchical structure is encoded according to the lowermost level encoding mode, the transformation unit encoding pattern information 71b, 71c, and 72a through 72h in the lowermost level may be encoded. Accordingly, an output bit string of the transformation unit encoding pattern information 75 encoded according to the lowermost level encoding mode may be '1011 0 1 1110'.

Accordingly, when a symbol distribution of the transformation unit encoding pattern information 61b, 61c, and 62a through 62h in the lowermost level is dense like the transformation unit encoding pattern information 75 having the second hierarchical structure, i.e., when a ratio of symbols whose symbol values are not 0 is high, encoding efficiency according to the lowermost level encoding mode is higher than that according to the symbol hierarchical encoding mode.

In other words, when the ratio of the symbols whose symbol values are 0 is high in the symbols having the hierarchical structure determined according to the data units having the hierarchical structure, i.e., when the symbol distribution is not dense, the encoding efficiency according to the symbol hierarchical encoding mode is higher than that according to the lowermost level encoding mode. On the other hand, when the ratio of the symbols whose symbol values are 0 is low, i.e., when the symbol distribution is dense, the encoding efficiency according to the lowermost level encoding mode is high.

Accordingly, the video encoding apparatus 100 may determine an optimized encoding method for symbols having a hierarchical structure by determining a symbol encoding method considering symbol characteristics, such as a symbol distribution.

The video encoding apparatus 100 may determine a symbol encoding method from among the symbol hierarchical encoding mode and the lowermost level encoding mode based on the encoding characteristics of the data units of the symbols.

Figure 8:
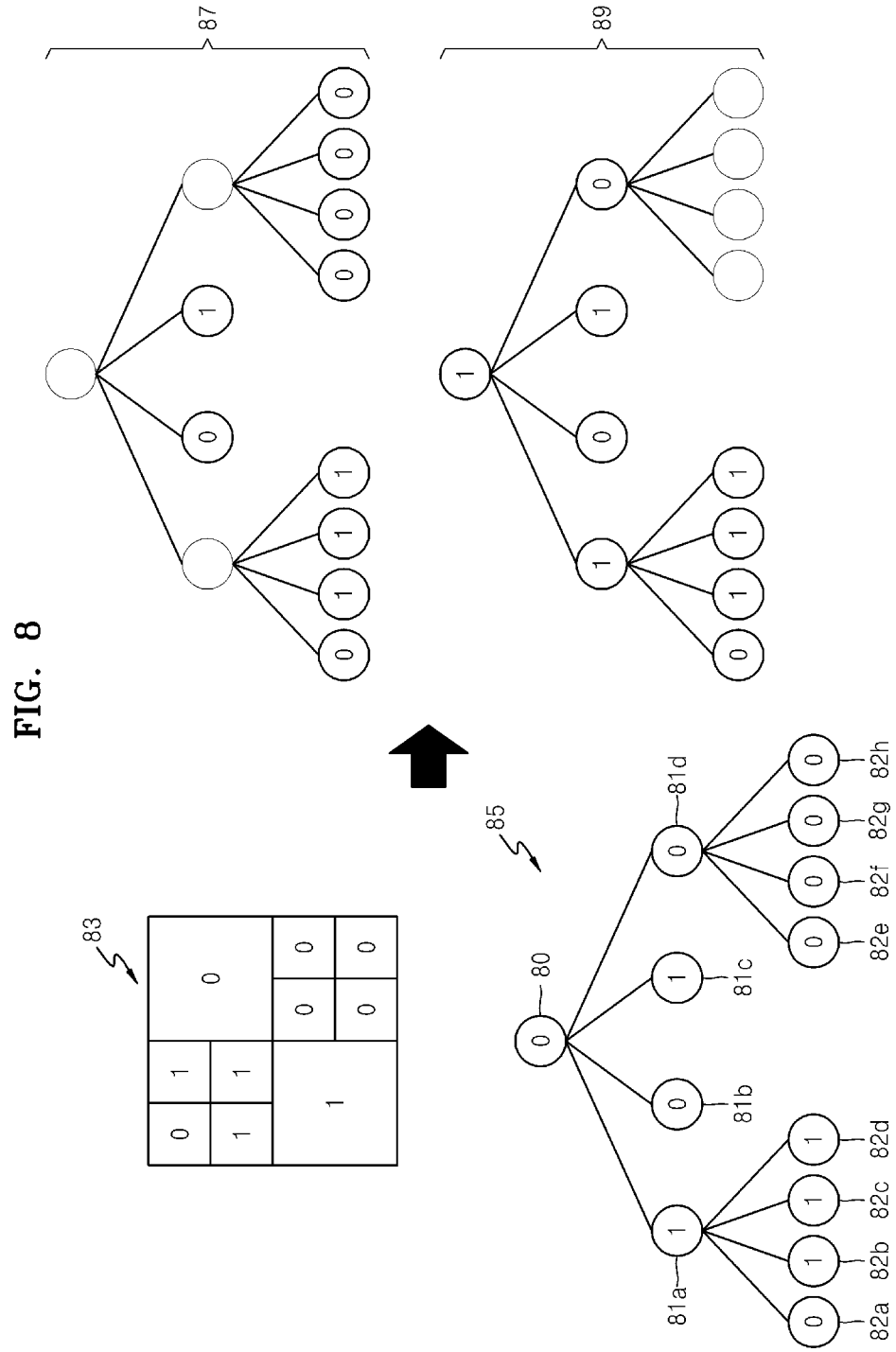
FIG. 8 illustrates an example of selecting one of a symbol hierarchical encoding mode and a lowermost level encoding mode, based on encoding characteristics, according to an exemplary embodiment.

FIG. 8 illustrates an example of selecting one of the symbol hierarchical encoding mode and the lowermost level encoding mode, based on the encoding characteristics, according to an exemplary embodiment.

The encoding characteristics that are basis for selecting the symbol hierarchical encoding mode or the lowermost level encoding mode used to encode transformation unit encoding pattern information 85 that is an example of symbols having a hierarchical structure of transformation units 83 that are data units having a hierarchical structure will now be described.

The transformation unit encoding pattern information 85 about the transformation units 83 that are the data units having the hierarchical structure may include transformation unit encoding pattern information 80, 81*a* through 81*d*, and 82*a* through 82*h* in levels 0, 1, and 2 determined with respect to transformation units in levels 0, 1, and 2.

A ratio of symbols whose symbol values are 0 may be characterized according to a prediction mode of the transformation units 83. For example, when the prediction mode of the transformation units 83 is an inter mode, the ratio of the symbols whose symbol values are 0 is high, and when the prediction mode is an intra mode, the ratio may be low.

Accordingly, the video encoding apparatus 100 and the video decoding apparatus 200 may respectively employ the lowermost level encoding mode and the lowermost level decoding mode when the prediction mode of the transformation units 83 is an intra mode. In other words, transformation unit encoding pattern information 87 transmitted and received in the transformation unit encoding pattern information 85 having the hierarchical structure according to the lowermost level encoding mode only includes the transformation unit encoding pattern information 81*b*, 81*c*, and 82*a* through 82*h* in a lowermost level.

Alternatively, the video encoding apparatus 100 and the video decoding apparatus 200 may respectively employ the symbol hierarchical encoding mode and the symbol hierarchical decoding mode when the prediction mode of the transformation units 83 is an inter mode. In other words, transformation unit encoding pattern information 89 transmitted and received in the transformation unit encoding pattern information 85 having the hierarchical structure according to the symbol hierarchical encoding mode includes the transformation unit encoding pattern information 80, 81*a* through 81*d*, and 82*a* through 82*d* according to the hierarchical structure.

As described above, even when only the transformation unit encoding pattern information 87 and 89 are encoded and transmitted to the video decoding apparatus 200 according to a symbol encoding method selected by the video encoding apparatus 100, all of the transformation unit encoding pattern information 85 may be restored from the transformation unit encoding pattern information 87 and 89 according to a symbol decoding method corresponding to the symbol encoding method.

Similarly, a ratio of transformation unit encoding pattern information whose symbol values are 0 may be characterized according to color components of the transformation units 83. For example, when the color components of the transformation units 83 are chroma components, the ratio of the transformation unit encoding pattern information whose symbol values are 0 may be high, and when the color components are luma components, the ratio may be low. Accordingly, the video encoding apparatus 100 and the video decoding apparatus 200 may respectively employ the lowermost level encoding mode and the lowermost level decoding mode when the color components of the transformation units 83 are luma components, and may respectively employ the symbol hierarchical encoding mode and the symbol hierarchical decoding mode when the color components are chroma components.

Alternatively, the ratio of the transformation unit encoding pattern information whose symbol values are 0 may be characterized according to encoding characteristics according to a combination of a prediction mode and color components of the transformation units 83. For example, when the combination of the prediction mode and the color components of the transformation units 83 is a combination of an intra mode and luma components, the ratio of the transformation unit encoding pattern information whose symbol values are 0 may be lowermost, whereas ratios of the transformation unit encoding pattern information whose symbol values are 0 may be high in remaining combinations. Accordingly, the video encoding apparatus 100 and the video decoding apparatus 200 may respectively employ the lowermost level encoding mode and the lowermost level decoding mode when the combination of the prediction mode and the color components is a combination of the intra mode and the luma components, and may respectively employ the symbol hierarchical encoding mode and the symbol hierarchical decoding mode in remaining combinations of the prediction modes and color components.

<Homogeneous Symbol Group Encoding and Decoding Modes>

The video encoding apparatus 100 may encode the symbols by selecting a symbol encoding method from among the homogeneous symbol group encoding mode and the homogeneous symbol individual encoding mode. In other words, the video encoding apparatus 100 may group and encode symbol values having a high correlation from among symbol values of homogeneous symbols according to a hierarchal structure based on the homogeneous symbol group encoding mode, or may individually encode symbols regardless of a correlation of symbol values of homogeneous symbols according to the homogeneous symbol individual encoding mode.

The video decoding apparatus 200 may decode symbols according to a symbol decoding method selectively determined from among the homogeneous symbol group decoding mode and the homogeneous symbol individual decoding mode. In other words, the video decoding apparatus 200 may read and decode all symbols having a hierarchical structure by reading symbol groups according to symbol patterns of homogeneous symbols from extracted symbol codes according to the homogeneous symbol group decoding mode. Alternatively, the video decoding apparatus 200 may read and decode symbols having a hierarchical structure by individually extracting symbol values of symbols from extracted symbol codes according to the homogeneous symbol individual decoding mode.

Figure 9:
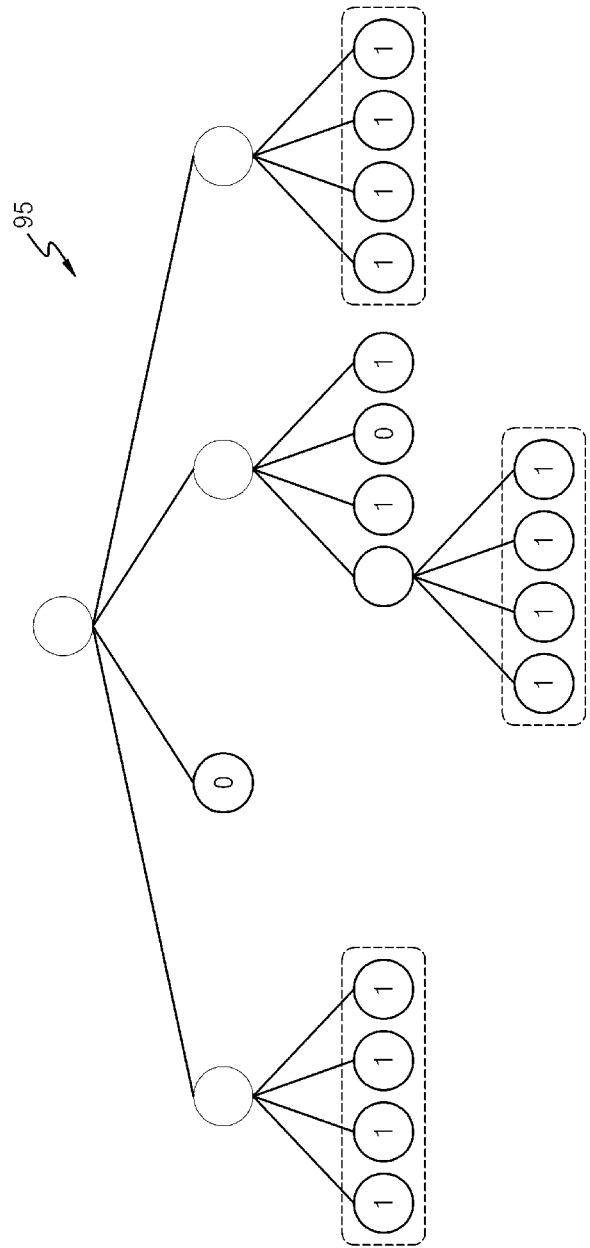
FIG. 9 is a diagram of symbols encoded according to a homogeneous symbol group encoding mode, according to an exemplary embodiment.

FIG. 9 is a diagram of symbols encoded according to the homogeneous symbol group encoding mode, according to an exemplary embodiment.

A predetermined pattern may be generated between symbol values of homogeneous symbols, for example, 4 symbols in a same level in symbols 95 having a hierarchical structure have symbol values of '1, 1, 1, 1'. Also, a frequency of a predetermined pattern may be particularly high in patterns of symbol values. Accordingly, the video encoding apparatus 100 may determine a symbol code table about corresponding symbols based on patterns between symbol values of homogeneous symbols having a high correlation.

In order to encode symbols according to the homogeneous symbol group encoding mode, intrinsic symbol codes may be assigned according to patterns based on patterns and frequencies of patterns of symbol values. A shorter symbol code may be assigned when a frequency is higher. Table 1 below is an example of a group table for encoding symbols having a hierarchical structure according to the homogeneous symbol group encoding mode.

TABLE 1

| Pattern of symbol values | Symbol code |
|---|---|
| 1, 1, 1, 1 | 1 |
| 1, 1, 1, 0 | 0100 |
| 1, 0, 1, 1 | 0101 |
| 0, 1, 1, 1 | 0110 |
| 1, 1, 0, 1 | 0111 |
| 1, 1, 0, 0 | 0010 |
| ... | ... |

According to the group table in Table 2, when the frequency of the pattern '1, 1, 1, 1' is highest in the symbol values of the 4 homogeneous symbols, the symbol code '1' that is shortest may be assigned to the pattern '1, 1, 1, 1', and longer symbol codes may be assigned to remaining patterns of symbol values.

Skip mode information denotes an encoding mode using information of adjacent data units that are pre-encoded while skipping encoding of intra and inter prediction information about a current data unit. The skip mode information may also be hierarchically determined according to the data units having the hierarchical structure. Accordingly, a shortest symbol code may be assigned to a pattern '1, 1, 1, 0' having a most frequency from among patterns of symbol values of the skip mode information, based on a symbol code table for encoding the skip mode information according to the homogeneous symbol group encoding mode.

The coding unit split information indicates whether a coding unit in an upper level is split into coding units in a lower level. The coding unit split information may also be hierarchically determined according to the data units having the hierarchical structure. Accordingly, a shortest symbol code may be assigned to a pattern '0, 0, 0, 1' having a most frequency from among patterns of symbol values of the coding unit split information, based on a symbol code table for encoding the coding unit split information according to the homogeneous symbol group encoding mode.

Also, the transformation unit encoding pattern information according to the combination of the prediction mode and the color components may also be hierarchically determined according to the transformation units having the hierarchical structure.

For example, a shortest symbol code may be assigned to a pattern '1, 1, 1, 1' having a most frequency from among patterns of symbol values of the transformation unit encoding pattern information, based on a symbol code table for encoding the transformation unit encoding pattern information in an intra luma mode according to the homogeneous symbol group encoding mode.

For example, a shortest symbol code may be assigned to a pattern '0, 0, 0, 0' having a most frequency from among patterns of symbol values of the transformation unit encoding pattern information, based on a symbol code table for encoding the transformation unit encoding pattern information in an inter chroma mode according to the homogeneous symbol group encoding mode.

The video decoding apparatus 200 may read and decode all of the symbols having the hierarchical structure by reading the patterns of the symbol values corresponding to the extracted symbol codes, based on the symbol code table determined according to the homogeneous symbol group decoding mode.

Tables 2, 3, and 4 below are respectively examples of symbol code tables for encoding (decoding) symbols according to the homogeneous group encoding (decoding) mode, with respect to transformation unit encoding pattern information (Inter cbf) in an inter mode, transformation unit encoding pattern information (Intra cbf) in an intra mode, and intra direction information (Intra direction).

TABLE 2

| Inter cbf | Symbol codes |
|---|---|
| 0, 0, 0, 0 | 1 |
| 0, 0, 0, 1 | 01 or 0 0000 or 0001 |
| 0, 0, 1, 0 | 001 or 0 0001 or 0010 |
| ... | ... |

TABLE 3

| Intra cbf | Symbol codes |
|---|---|
| 1, 1, 1, 1 | 0 |
| 1, 1, 1, 0 | 10 or 0 1111 or 1110 |
| 1, 1, 0, 1 | 110 or 0 1110 or 1101 |
| ... | ... |

TABLE 4

| Intra direction | New symbol |
|---|---|
| 2, 2, 2, 2 | 0 |
| 2, 2, 2, 0 | 1 |
| 2, 2, 2, 1 | 2 |
| ... | ... |

<Heterogeneous Symbol Group Encoding and Decoding Modes>

The video encoding apparatus 100 may encode heterogeneous symbols by selecting a symbol encoding method from among the heterogeneous symbol group encoding mode and the heterogeneous symbol individual encoding mode. In other words, the video encoding apparatus 100 may group and encode heterogeneous symbols having a high correlation according to a hierarchical structure based on the heterogeneous symbol group encoding mode, or individually encode heterogeneous symbols regardless of a correlation between heterogeneous symbols according to the heterogeneous symbol individual encoding mode.

The video decoding apparatus 200 may decode symbols according to a symbol decoding method selectively determined from among the heterogeneous symbol group decoding mode and the heterogeneous symbol individual decoding mode. In other words, the video decoding apparatus 200 may decode each of heterogeneous symbols having a hierarchical structure by reading groups of heterogeneous symbols from extracted symbol codes, according to the heterogeneous symbol group decoding mode. Alternatively, the video decoding apparatus 200 may read and decode heterogeneous symbols having a hierarchical structure from individually extracted symbol codes of heterogeneous symbols, according to the heterogeneous symbol individual decoding mode.

Correlations between heterogeneous symbols that may be considered in the heterogeneous symbol group encoding mode and the heterogeneous symbol group decoding mode may include functional similarities, dependencies, and continuities of encoding characteristics indicated by heterogeneous symbols.

When certain functions indicated by heterogeneous symbols are similar during an encoding process based on data units having a hierarchical structure, the video encoding apparatus 100 may group and encode the heterogeneous symbols considering that a correlation between the heterogeneous symbols is high. The video encoding apparatus 100 may share a context model of heterogeneous symbols having similar functions so as to encode the heterogeneous symbols by using a shared context.

Figure 10:
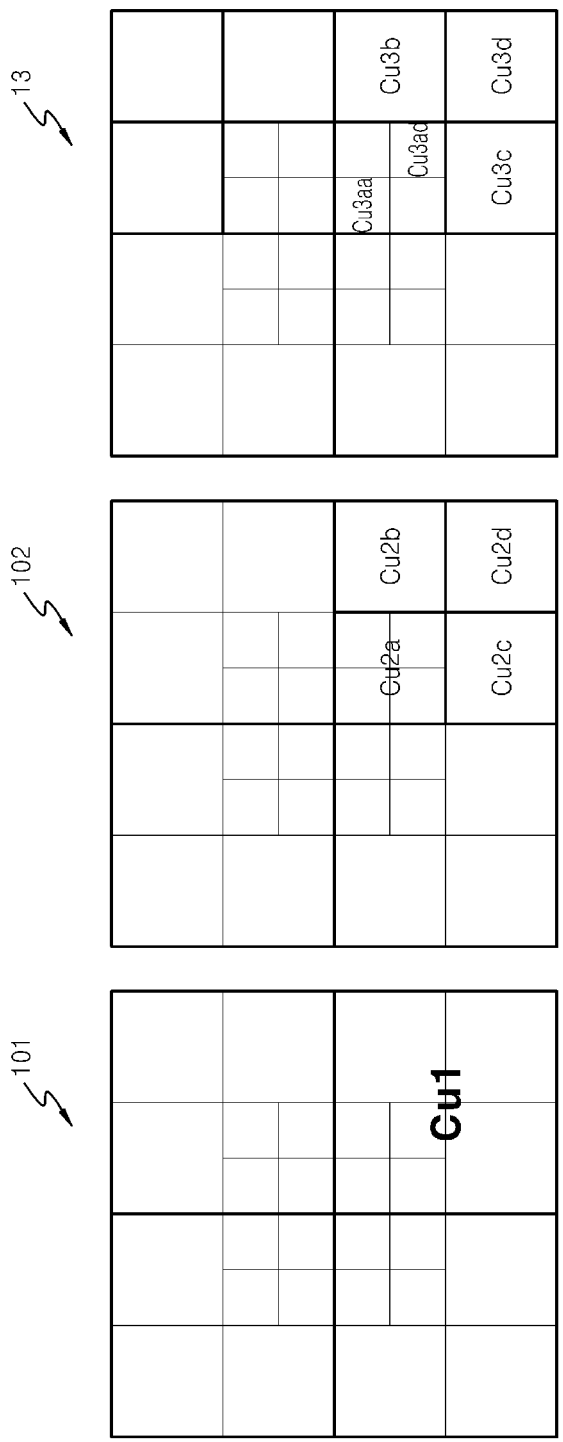
FIG. 10 illustrates an example of selecting a heterogeneous symbol group encoding mode, according to an exemplary embodiment.

FIG. 10 illustrates an example of selecting the heterogeneous symbol group encoding mode, according to an exemplary embodiment.

In maximum coding units 101, 102, and 103, blocks in thick boundaries denote coding units and blocks in thin boundaries denote transformation units. A transformation unit cannot be larger than a corresponding coding unit.

According to a coding unit split information having a hierarchical structure, when the maximum coding units 101, 102, and 103 are in level 0 that is an uppermost level, the maximum coding units 101, 102, and 103 may be split into coding units in level 1, such as coding unit Cu1, and the coding units in level 1 may be split into coding units in level 2, such as coding units Cu2a through Cu2d and Cu3b through Cu3d. The coding units in level 2 may be split into coding units in level 3, such as coding units Cu3aa and Cu3ad.

For example, the coding unit split information denotes a function of splitting a current coding unit into coding units in lower levels during an encoding process based on coding units having a hierarchical structure. Also, the transformation unit split information denotes a function of splitting a current transformation unit in a current coding unit into transformation units in lower levels during an encoding process based on coding units having a hierarchical structure.

Accordingly, the coding unit split information and the transformation unit split information, which have a hierarchical structure, have similar functions since a data unit in an upper level is split during an encoding process.

For example, according to the heterogeneous symbol individual encoding mode, in the coding unit split information of a current region, symbols are encoded by using a context determined by referring to a depth (level) of adjacent coding units that are pre-encoded. In the transformation unit split information of a current region, symbols are encoded by using a context determined by referring to a transformation depth (level) of a current transformation unit.

However, even when a predetermined data unit is determined according to the coding unit split information and the transformation unit split information, a depth (level) of the predetermined data unit may be unique regardless of a depth of an adjacent coding unit that is a basis of the context of the coding unit split information, or a depth of a current transformation unit that is a basis of the context of the transformation unit split information.

For example, when a depth of an adjacent coding unit is deep (lower level) and a depth of a current transformation unit is not deep (upper level), the depth of the current transformation unit may be deep even when a depth of a current coding unit is not deep. In the same manner, a depth of a current transformation unit should be deep if a depth of a current coding unit is deep.

Alternatively, when a depth of an adjacent coding unit is not deep (upper level) and a depth of a current transformation unit is deep (lower level), the depth of the current transformation unit may not be deep when a depth of a current coding unit is also deep. In the same manner, a depth of a current transformation unit may be deep if a depth of a current coding unit is not deep.

The coding unit split information and the transformation unit split information show similar functions for determining a current region, and may be simultaneously used. Accordingly, in order to reflect all particular cases regardless of general contexts, the video encoding apparatus 100 may use a content shared between the coding unit split information and the transformation unit split information in order to encode the coding unit split information and the transformation unit split information.

In other words, the coding unit split information and the transformation unit split information may be grouped and encoded or decoded by using the shared context according to the combination of the coding unit split information and the transformation unit split information, instead of individually using a context according to the coding unit split information and a context according to the transformation unit split information.

For example, according to the heterogeneous symbol group encoding mode, both of the coding unit split information and the transformation unit split information may be encoded or decoded by using a context based on a depth of an adjacent coding unit and a transformation depth of a current transformation unit.

Alternatively, according to the heterogeneous symbol group encoding mode, the coding unit split information may be encoded by using a context based on a depth of an adjacent coding unit, but the transformation unit split information may be encoded or decoded by using a context based on a depth of an adjacent coding unit and a transformation depth of a current transformation unit.

Alternatively, according to the heterogeneous symbol group encoding mode, the transformation unit split information may be encoded by using a context based on a depth of a current transformation unit, but the coding unit split information may be encoded or decoded by using a context based on a depth of an adjacent coding unit and a transformation depth of a current transformation unit.

Combinations of heterogeneous symbols that are determined to be encoded or decoded in the heterogeneous symbol group encoding or decoding mode by using a context shared based on functional similarities between the heterogeneous symbols may not only include a combination of coding unit split information and transformation unit split information, but may also include at least one of a combination of transformation unit split information and encoding pattern information, a combination of a prediction mode of coding units and a prediction method information, a combination of coding unit split information and skip information, a combination of encoding pattern information according to two or more color components, and a combination of encoding pattern information according to two or more color components and transformation unit split information.

Accordingly, the video decoding apparatus 200 may decode each of the heterogeneous symbols by using the context shared between the heterogeneous symbols having the similar functions.

Also, when the symbols are encoded according to the heterogeneous symbol group encoding mode, the video encoding apparatus 100 may group and encode heterogeneous symbols having high dependency of determining a following symbol according to a preceding symbol. In other words, symbol codes may be assigned to combinations of symbol values based on a probability distribution of combinations of symbol values of heterogeneous symbols that are dependently determined.

The video encoding apparatus 100 may use transformation unit encoding pattern information specified according to a symbol value of transformation unit split information with respect to transformation unit split information in a predetermined level.

For example, when a symbol value of transformation unit split information is 0 with respect to a luma component transformation unit, transformation unit encoding pattern information may be determined to be 0 or 1. Here, a symbol value of transformation unit split information may be 1 and a symbol value of transformation unit encoding pattern information may be '0000' or '1111' with respect to a transformation unit in a level upper than a currently permitted final level from among transformation depths having a hierarchical structure.

Accordingly, when a luma component transformation unit is in a level upper than a final level, the video encoding apparatus 100 may group and encode symbols of transformation unit split information and transformation unit encoding pattern information by assigning one symbol code per combination of the transformation unit split information and the transformation unit encoding pattern information, based on a probability distribution of symbol values of the transformation unit split information and transformation unit encoding pattern information.

Table 5 shows an example of a symbol code table for encoding transformation unit split information (TrSubDiv) and transformation unit encoding pattern information (cbf) about a luma component transformation unit in a level upper than a final level, in the heterogeneous symbol group encoding mode. Here, probability of a combination of transformation unit split information having a symbol value of '1' and transformation unit encoding pattern information having a symbol pattern of '1, 1, 1, 1' may be highest.

TABLE 5

| Combination of heterogeneous symbols | Symbol code |
|---|---|
| TrSubDiv = 1 & CBF = 1111 | 1 |
| TrSubDiv = 0 & CBF = 1 | 01 |
| TrSubDiv = 0 & CBF = 0 | 001 |
| ... | ... |

In the same manner, transformation unit encoding pattern information may not be encoded when a symbol value of transformation unit split information is 1, with respect to a transformation unit in an uppermost level or an intermediate level from among transformation depths.

Accordingly, even in a luma transformation unit in an uppermost level or an intermediate level, the video encoding apparatus 100 may group and encode symbols of transformation unit split information and transformation unit encoding pattern information by assigning symbol codes to a combination of the transformation unit split information and the transformation unit encoding pattern information based on a probability distribution of symbol values of the transformation unit split information and the transformation unit encoding pattern information.

Table 6 shows an example of a symbol code table for encoding transformation unit split information (TrSubDiv) and transformation unit encoding pattern information (cbf) in the heterogeneous symbol group encoding mode, with respect to a luma component transformation unit in an uppermost level or an intermediate level. A probability may be highest in a combination of transformation unit split information having a symbol value of '0' and transformation unit encoding pattern information having a symbol pattern of '0'.

TABLE 6

| Combination of heterogeneous symbols | Symbol code |
|---|---|
| TrSubDiv = 0 & CBF = 0 | 1 |
| TrSubDiv = 0 & CBF = 1 | 01 |
| TrSubDiv = 1 | 001 |
| ... | ... |

The video encoding apparatus 100 may use skip mode information according to symbol values of coding unit split information.

For example, skip mode information may be encoded with respect to a coding unit in a final level that is no longer split, or a coding unit having coding unit split information whose symbol value is 0.

Accordingly, the video encoding apparatus 100 may group and encode symbols of coding unit split information and skip mode information by assigning a symbol code per combination of the coding unit split information and the skip mode information, based on a probability distribution of symbol values of the coding unit split information and the skip mode information.

Table 7 shows an example of a symbol code table for encoding coding unit split information (Split) and skip mode information (Skip) with respect to a coding unit, in the heterogeneous symbol group encoding mode. Also, since a probability distribution of symbol values of the coding unit split information and the skip mode information may differ according to a current slice type (P-slice or B-slice), different code tables may be set according to the current slice type.

TABLE 7

| | Symbol code | |
|---|---|---|
| Combination of heterogeneous symbols | P-slice | B-slice |
| Split = 1 | 0 | 10 (or 0) |
| Split = 0 & Skip = 0 | 10 | 110 (or 110) |
| Split = 0 & Skip = 1 | 110 | 0 (or 10) |

The video encoding apparatus 100 may variously determine prediction method information according to prediction modes of coding units.

Prediction modes of coding units may include at least one skip mode, at least one intra mode, and at least one inter mode. For example, various skip modes, such as a skip 0 mode and a skip 1 mode, various intra modes, such as an intra 0 mode and an intra 1 mode, and various inter modes, such as an inter 0 mode and an inter 1 mode, may be used as the prediction modes.

Various skip modes may indicate various prediction information encoding methods, such as a general skip mode, a merge mode, and a direct mode. Various intra modes may indicate various intra prediction directions, such as a DC mode, a vertical mode, and a horizontal mode. Various inter modes may indicate various inter prediction directions, such as a forward direction, a backward direction, a bi-direction, and a direct direction.

Based on whether a prediction mode of a coding unit is a skip mode, an intra mode, or an inter mode, detailed prediction method information indicating a prediction information encoding method, an intra prediction direction, and an inter prediction method may be encoded.

Accordingly, the video encoding apparatus 100 may group and encode symbols of a prediction mode of a coding unit and detailed prediction method information by assigning a symbol code per combination of the prediction mode and the detailed prediction method information, according to a probability distribution of symbol values of the prediction mode and the detailed prediction method information. Also, since a prediction mode may be specified according to a current slice type, different symbol codes may be determined according to current slice types.

Table 8 below shows an example of a symbol code table for encoding the prediction mode of the coding unit and the detailed prediction method information according to slice types, in the heterogeneous symbol group encoding mode.

TABLE 8

| Slice type | Prediction mode and detailed prediction method | Symbol code |
| --- | --- | --- |
| I-slice | Intra & DC mode | 1 |
| | Intra & vertical mode | 01 |
| | Intra & horizontal mode | 001 |
| | ... | ... |
| P-slice | Skip & general skip mode | 1 |
| | Skip & merge mode | 01 |
| | Inter & all directions | 001 |
| | ... | ... |
| B-slice | Skip & general skip mode | 1 |
| | Skip & direct mode | 01 |
| | Skip % merge mode | 001 |
| | ... | ... |

For example, when the symbols are encoded according to the heterogeneous symbol group encoding mode, the hierarchical symbol encoder 130 may assign symbol codes to combinations of symbol values of heterogeneous symbols generated between heterogeneous symbols that are sequentially determined. The hierarchical symbol encoder 130 may output symbol codes assigned to the combinations of symbol values of the heterogeneous symbols.

Alternatively, when the symbols are encoded according to the heterogeneous symbol group encoding mode, the video encoding apparatus 100 may group and encode heterogeneous symbols that are sequentially determined. In other words, symbol codes may be assigned to the combinations of symbol values of heterogeneous symbols that are sequentially determined.

The video encoding apparatus 100 and the video decoding apparatus 200 may use reference frame index information indicating a reference frame index for prediction encoding of a current frame, and motion vector predictor index information. The reference frame index information and the motion vector predictor index information may be sequentially encoded by the video encoding apparatus 100 to be sequentially extracted and decoded by the video decoding apparatus 200.

In order to encode symbols in the heterogeneous symbol group encoding mode, a new symbol value may be assigned to each of capable combinations of symbol values of the reference frame index information and the motion vector predictor index information. Tables 9 through 11 below show examples of symbol tables for encoding reference frame index information (RefFrmIdx) and motion vector predictor index information (MVPIdx) in the heterogeneous symbol group encoding mode.

TABLE 9

| Combination of symbol values | New symbol value |
| --- | --- |
| RefFrmIdx = 0 & MVPIdx = 0 | 0 |
| RefFrmIdx = 0 & MVPIdx = 1 | 1 |
| RefFrmIdx = 1 & MVPIdx = 0 | 2 |
| RefFrmIdx = 1 & MVPIdx = 1 | 3 |
| RefFrmIdx = 0 & MVPIdx = 2 | 4 |
| ... | ... |
| RefFrmIdx = 3 & MVPIdx = 0 | 10 |

TABLE 10

| Combination of symbol values (when RefFrmIdx only has value of 0 or 1) | New symbol value |
| --- | --- |
| RefFrmIdx = 0 & MVPIdx = 0 | 0 |
| RefFrmIdx = 0 & MVPIdx = 1 | 1 |
| RefFrmIdx = 0 & MVPIdx = 2 | 2 |
| RefFrmIdx = 1 & MVPIdx = 0 | 3 |
| ... | ... |

TABLE 11

| Combination of symbol values (when MVPIdx only has value of 0 or 1) | New symbol value |
| --- | --- |
| RefFrmIdx = 0 & MVPIdx = 0 | 0 |
| RefFrmIdx = 0 & MVPIdx = 1 | 1 |
| RefFrmIdx = 1 & MVPIdx = 0 | 2 |
| RefFrmIdx = 2 & MVPIdx = 0 | 3 |
| ... | ... |

A symbol value newly assigned to the combination of the reference frame index information and the motion vector predictor index information may be output as a symbol code.

Also, symbols may be encoded (decoded) in the heterogeneous symbol group encoding (decoding) mode with respect to heterogeneous symbols that are single symbols of transformation unit encoding pattern information but are used for another purpose, such as luma component transformation unit encoding pattern information and chroma component transformation unit encoding pattern information.

The video decoding apparatus 200 may decode each of the heterogeneous symbols having a hierarchical structure by reading the combination of the heterogeneous symbols corresponding to the symbol code extracted from the bitstream, based on the symbol code assigned to the combination of the heterogeneous symbols according to the heterogeneous symbol group decoding mode.

<Symbol Reverse Encoding and Decoding Modes>

The video encoding apparatus 100 may encode the symbols having the hierarchical structure by selecting a symbol encoding method from among the symbol reverse encoding mode and the non-reverse encoding mode. In other words, the video encoding apparatus 100 may reverse and encode symbol values 0 and 1 of symbols in a predetermined level from among heterogeneous symbols having a hierarchical structure according to the symbol reverse encoding mode, or may encode symbols without reversing symbol values according to the non-reverse encoding mode.

The video decoding apparatus 200 may decode symbols according to a symbol decoding method selectively determined from among the symbol reverse decoding mode and the non-reverse decoding mode. In other words, the video decoding apparatus 200 may read symbols by reversing extracted symbol codes in a predetermined level, and read and decode remaining symbols based on the read symbols whose symbol codes are reversed, according to the symbol reverse decoding mode. Also, the video decoding apparatus 200 may read and decode symbols without reversing symbol codes of extracted symbols, according to the non-reverse decoding mode.

Figure 11:
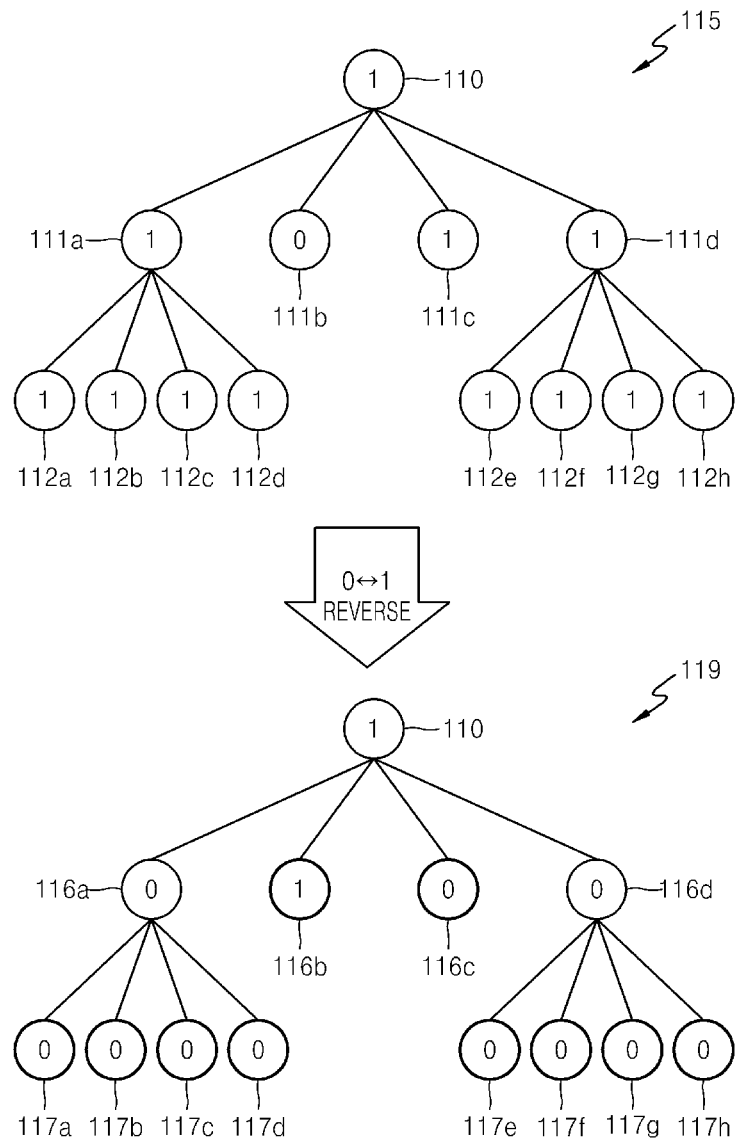
FIG. 11 is a diagram of symbols encoded according to a symbol reverse encoding mode, according to an exemplary embodiment.

FIG. 11 is a diagram of symbols encoded according to the symbol reverse encoding mode, according to an exemplary embodiment.

When symbols 115 having a hierarchical structure determined according to data units having a hierarchical structure are encoded according to the symbol hierarchical encoding mode, all of transformation unit encoding pattern information 110, 111a through 111d, and 112a through 112h in levels 0, 1, and 2 may be encoded. Accordingly, an output bit string of the symbols 115 encoded according to the symbol hierarchical encoding mode may be '1 1 1111 0 1 1 1111'.

The video encoding apparatus 100 may reverse and encode symbol values of the symbols 111b, 111c, and 112a through 112h in a lowermost level from among the symbols 115 having the hierarchical structure, according to the symbol reverse encoding mode.

In other words, as results of reversing the symbol values of the symbols 111b, 111c, and 112a through 112h in the lowermost level, symbols 116b, 116c and 117a through 117h may be encoded, and symbols 116a and 116d in level 1 may be reversed from the original symbols 111a and 111d according to the reversed symbols 117a through 117h in level 2.

As the results of reversing the symbol values, an output bit string of symbols 119 having a hierarchical structure may be '1 0 1 0 0'.

Accordingly, when a ratio of symbols whose symbol values are not 0 is high in the symbols 115, i.e., when a symbol distribution is dense, the symbol distribution may become not dense if symbol values 0 and 1 of symbols in a lowermost level are reversed. Encoding efficiency may be high in symbols whose symbol distribution is not dense.

Accordingly, the video encoding apparatus 100 may determine an optimum encoding method for symbols having a hierarchical structure by determining whether to reverse and encode symbol values of symbols in a lowermost level while considering symbol characteristics, such as a symbol distribution.

Figure 12:
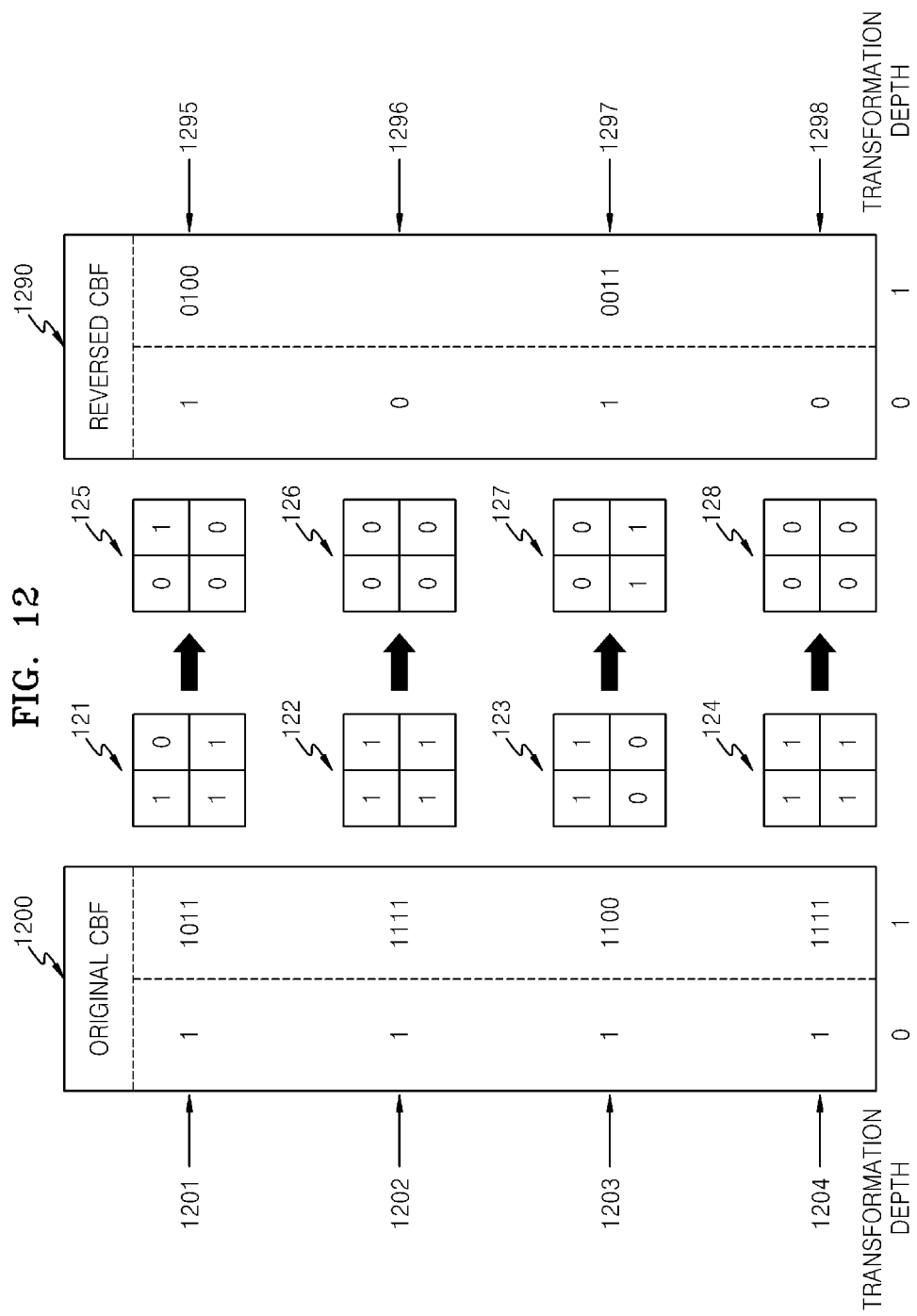
FIG. 12 is a diagram for describing encoding and decoding processes of symbols according to a symbol reverse encoding mode, according to an exemplary embodiment.

FIG. 12 is a diagram for describing encoding and decoding processes of symbols according to the symbol reverse encoding mode, according to an exemplary embodiment.

According to an original transformation unit encoding pattern information table 1200 about original transformation units 121 through 124, transformation unit encoding pattern information 1201 through 1204 of the original transformation units 121 through 124 have a dense symbol distribution since a ratio of symbol values that are not 0 is high.

When symbol values in a lowermost level from among the transformation unit encoding pattern information 1201 through 1204 are reversed according to the symbol reverse encoding mode, the symbol values in the lowermost level may be changed to symbol values in a lowermost level of transformation unit encoding pattern information 1295 through 1298. Specifically, the symbol values in the lowermost level of the transformation unit encoding pattern information 1296 and 1298 are 0, and thus transformation unit encoding pattern information in a transformation depth 1 may be reversed to 0.

Thus, according to a transformation unit encoding pattern information table 1290 about transformation units 125 through 128 whose symbol values are reversed, a code length to be encoded is shorter compared to before the symbol values are reversed.

The symbol encoding methods and the symbol decoding methods for symbols having a hierarchical structure have been described above with reference to FIGS. 3 through 12. Predetermined symbols are used to describe the symbol encoding and decoding methods for convenience of description, but it would be obvious to one of ordinary skill in the art that symbols to which the symbol encoding and decoding methods are applicable are limited to those described with reference to FIGS. 3 through 12, and may be any symbols having a hierarchical structure.

Also, since Tables 1 through 11 are examples for convenience of description, and thus the symbol code tables for the symbol encoding and decoding modes are not limited to Tables 1 through 11 and may be any symbol code tables in which symbol patterns and symbol codes are mapped in different manners.

Figure 13:
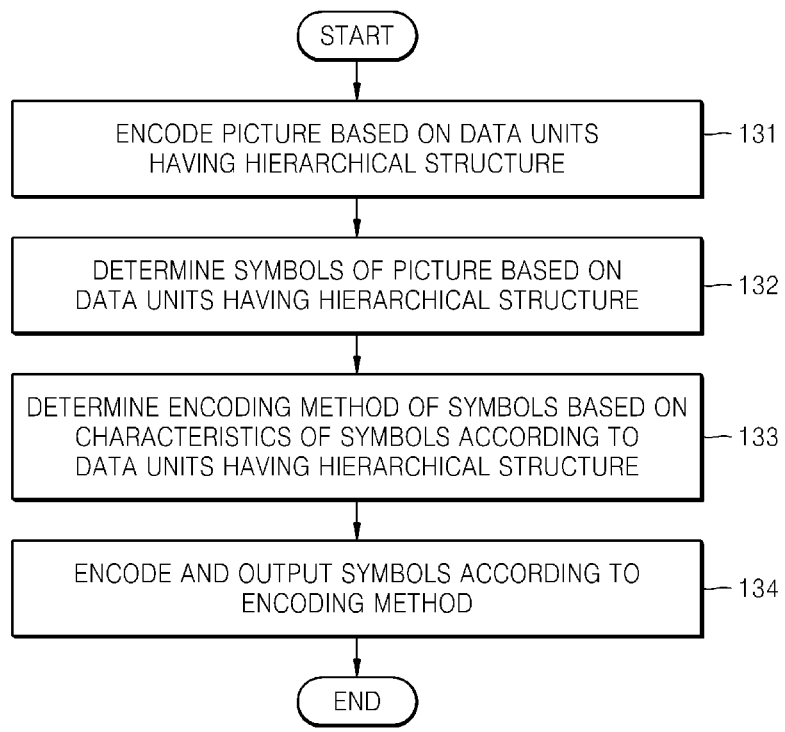
FIG. 13 is a flowchart illustrating a video encoding method for encoding symbols having a hierarchical structure, according to an exemplary embodiment.

FIG. 13 is a flowchart illustrating a video encoding method for encoding symbols having a hierarchical structure, according to an exemplary embodiment.

In operation 131, a picture of an input video is encoded based on data units having a hierarchical structure. In operation 132, symbols of the encoded picture are determined based on the data units having the hierarchical structure.

In operation 133, an encoding method of the symbols is determined based on characteristics of the symbols determined according to the data units having the hierarchical structure.

According to an exemplary embodiment, the symbol encoding method may be selectively determined from among the symbol hierarchical encoding mode, wherein symbols determined according to data units having a hierarchical structure are encoded according to the data units having the hierarchical structure, and the lowermost level encoding mode, wherein symbols of data units in a lowermost level are encoded. The symbol encoding method may be determined from among the symbol hierarchical encoding mode and the lowermost level encoding mode, based on the encoding characteristics including at least one of the prediction mode information and color components of the data units of the symbols.

According to an exemplary embodiment, the symbol encoding method may be selectively determined from among the homogeneous symbol group encoding mode, wherein homogeneous symbols are grouped and encoded, and the homogeneous symbol individual encoding mode, wherein homogeneous symbols are individually encoded, based on a correlation between symbol values of homogeneous symbols determined according to data units having a hierarchical structure. According to an exemplary embodiment, the symbol encoding method may be determined from among the homogeneous symbol group encoding mode and the homogeneous symbol individual encoding mode, based on encoding characteristics including at least one of prediction mode information, a slice type, a color component, a coded depth, and a transformation depth of the data units of the symbols.

According to an exemplary embodiment, the symbol encoding method may be selectively determined from among the heterogeneous symbol group encoding mode, wherein heterogeneous symbols are grouped and encoded, and the heterogeneous symbol individual encoding mode, wherein heterogeneous symbols are individually encoded, based on a correlation of heterogeneous symbols determined according to data units having a hierarchical structure. According to an exemplary embodiment, the symbol encoding method may be determined based on at least one of a correlation of functions indicated by heterogeneous symbols having a hierarchical structure, dependent encoding, and sequential encoding.

According to an exemplary embodiment, the symbol encoding method may be selectively determined from among the symbol reverse encoding mode, wherein symbol values of symbols of data units in a lowermost level are reversed and encoded, and the non-reverse encoding mode, wherein symbol values of symbols of data units in a lowermost level are encoded without being reversed, based on a ratio of symbol values that are 0 in symbol values of data units having a hierarchical structure. The symbol reverse encoding mode may be selectively determined based on encoding characteristics of data units including at least one of prediction mode information, a slice type, a color component, a coded depth, and a transformation depth of data units of symbols.

The symbol encoding method may be determined according to each data section from among a slice, a picture, sequence, and maximum coding unit of a video, and symbol encoding method information indicating the symbol encoding method per data section may be encoded.

In operation 134, the symbols are encoded according to the encoding method determined in operation 133.

The symbols determined according to the data units having the hierarchical structure may be encoded and output according to the data units having the hierarchical structure, according to the symbol hierarchical encoding mode. Only the symbols of the data units in the lowermost level from among the data units having the hierarchical structure may be encoded and output according to the lowermost level encoding mode.

A symbol code table may be determined based on frequencies of patterns of symbol values of homogeneous symbols, and symbol codes corresponding to patterns of homogeneous symbols of the data units may be output based on the symbol code table, according to the homogeneous symbol group encoding mode.

A context shared by heterogeneous symbols may be determined and heterogeneous symbols of data units may be encoded and output based on the shared context, according to the heterogeneous symbol group encoding mode. Symbol codes of heterogeneous symbols of data units may be output based on symbol codes assigned to combinations of symbol values of heterogeneous symbols that are interdependently or sequentially determined, according to the heterogeneous symbol group encoding mode.

Symbol values of data units in a lowermost level may be reversed and symbols may be encoded and output accordingly, according to the symbol reverse encoding mode.

Figure 14:
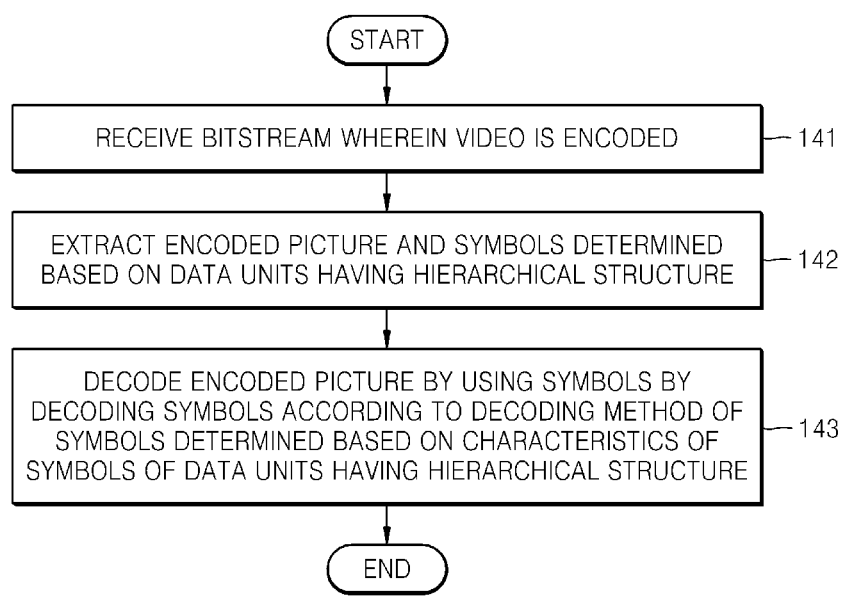
FIG. 14 is a flowchart illustrating a video decoding method for decoding symbols having a hierarchical structure, according to an exemplary embodiment.

FIG. 14 is a flowchart illustrating a video decoding method for decoding symbols having a hierarchical structure, according to an exemplary embodiment.

In operation 141, a bitstream including an encoded picture of a video is received. In operation 142, the encoded picture and symbols determined based on data units having a hierarchical structure are extracted from the bitstream by parsing the bitstream.

In operation 143, the encoded picture is decoded by using the symbols by determining a decoding method of symbols and decoding the symbols according to the decoding method, based on characteristics of the symbols determined based on the data units having the hierarchical structure.

The symbol decoding method may be selectively determined from among the symbol hierarchical decoding mode, wherein symbols having a hierarchical structure are decoded according to data units having a hierarchical structure, and the lowermost level decoding mode, wherein symbols of data units in a lowermost level from among data units having a hierarchical structure are decoded.

The symbols determined according to the data units having the hierarchical structure may be read and decoded according to the data units having the hierarchical structure, based on the symbol hierarchical decoding mode.

Only the symbols of the data units in the lowermost level may be read and symbols of remaining data units may be read based on the read symbols of the data units in the lowermost level, according to the lowermost level decoding mode.

The symbol decoding method may be selectively determined from among the homogeneous symbol group decoding mode, wherein homogeneous symbols are grouped and decoded based on a correlation between symbol values of homogeneous symbols having a hierarchical structure, and the homogeneous symbol individual decoding mode, wherein homogeneous symbols are individually decoded. Homogeneous symbols and patterns of symbol values of the homogeneous symbols may be read from symbol codes of the homogeneous symbols of the data units, based on a symbol code table based on frequencies of the patterns of the symbol values of the homogeneous symbols, according to the homogeneous symbol group decoding mode.

The symbol decoding method may be selectively determined from among the heterogeneous symbol group decoding mode, wherein heterogeneous symbols are grouped and decoded, and the heterogeneous symbol individual decoding mode, wherein heterogeneous symbols are individually decoded, based on a correlation of heterogeneous symbols having a hierarchical structure.

Heterogeneous symbols of data units may be read based on a context determined to be shared between the heterogeneous symbols, according to the heterogeneous symbol group decoding mode. Combinations of symbol values of heterogeneous symbols may be read and each heterogeneous symbol may be read based on symbol codes assigned to the combinations of the symbol values of the heterogeneous symbols that are interdependently determined, according to the heterogeneous symbol group decoding mode.

The symbol decoding method may be selectively determined from among the symbol reverse decoding mode, wherein symbol values of symbols of data units in a lowermost level from among data units having a hierarchical structure are reversed and decoded, and the non-reverse decoding mode, wherein symbol values of symbols of data units are decoded without being reversed. Symbol values of symbols of data units in a lowermost level from among extracted symbol values may be reversed, and symbols of data units in an upper level may be decoded based on the reversed symbol values, according to the symbol reverse decoding mode.

Symbol decoding method information indicating the symbol decoding method may be extracted according to a data section from among a slice, a picture, a sequence, and a maximum coding unit of a video, and the symbol decoding method used per data section may be determined based on the symbol decoding method information.

Symbols are efficiently encoded since an optimum symbol encoding method is determined according to symbol characteristics of symbols having a hierarchical structure determined during an encoding process of data units having a hierarchical structure, according to symbol encoding and symbol decoding. Also, even if only some of symbols from among the symbols having the hierarchical structure are received, remaining symbols may be all restored according to the symbol decoding method, and thus the symbols may be efficiently decoded.

Accordingly, since a video is encoded based on data units having a hierarchical structure during a video encoding process, encoding information about an encoding method and an encoding mode may be encoded so as to accurately decode the video. The encoding information having a hierarchical structure may be encoded as symbols, and output in a form of symbol codes. Since encoding information about an encoded picture is read based on data units having a hierarchical structure from restored symbols during a video decoding process, a video may be reconstructed by reconstructing a picture and picture sequence by using the encoding information.

<Symbol Encoding and Decoding According to Coding Units Having Tree Structure and Transformation Units Having Tree Structure>

Hereinafter, video encoding and decoding apparatuses for encoding and decoding symbols having a tree structure, based on coding units having a tree structure and transformation units having a tree structure, and corresponding video encoding and decoding methods will now be described with reference to FIGS. 15 through 27.

The video encoding apparatus 100 may encode a video based on the coding units and transformation units having the tree structure.

A current picture may be split based on a maximum coding unit for a current picture of an image. If the current picture is larger than the maximum coding unit, image data of the current picture may be split into the at least one maximum coding unit. The maximum coding unit may be a data unit having a size of 32×32, 64×64, 128×128, 256×256, etc., wherein a shape of the data unit is a square having a width and length in squares of 2. The picture hierarchical encoder 120 may encode the picture data according to the at least one maximum coding unit.

A coding unit may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The picture hierarchical encoder 120 encodes at least one split region obtained by splitting a region of the maximum coding unit according to depths, and determines a depth to output a finally encoded image data according to the at least one split region. In other words, the picture hierarchical encoder 120 determines a coded depth by encoding the image data in the deeper coding units according to depths, according to the maximum coding unit of the current picture, and selecting a depth having the least encoding error.

The picture hierarchical encoder 120 may output the encoded image data in the deeper coding units according to the maximum coding unit. Also, the picture hierarchical encoder 120 may transmit information about the determined coded depth to the hierarchical symbol encoder 130 so that the information about the coded depth is encoded as encoding information.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the picture hierarchical encoder 120 may determine coding units having a tree structure included in the maximum coding unit. The 'coding units having a tree structure' include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth is an index related to the number of splitting times from a maximum coding unit to a minimum coding unit. A first maximum depth may denote the total number of splitting times from the maximum coding unit to the minimum coding unit. A second maximum depth may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

Similarly to the coding unit, the transformation unit in the coding unit may be recursively split into smaller sized regions, so that the transformation unit may be determined independently in units of regions. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is thus N×N, and may be 2 when the size of the transformation unit is thus N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the picture hierarchical encoder 120 not only determines a coded depth having a least encoding error, but also determines a partition type in a prediction unit, a prediction mode according to prediction units, and a size of a transformation unit for transformation.

Alternatively, the picture hierarchical encoder 120 may perform transformation by using the transformation units having the tree structure while encoding the coding unit, based on a maximum split level of the transformation units pre-limitedly set according to maximum coding unit of current coding unit.

A basic transformation unit having a size smaller than or equal to a coding unit may be split into transformation units having lower transformation depths, according to deeper coding units. The transformation units having the hierarchical structure may include the basic transformation unit having a currently permitted maximum size, and transformation units from a maximum split level to lower levels permitted in a coding unit.

The picture hierarchical encoder 120 may determine the transformation units having the tree structure, which are independent from transformation units in adjacent regions and form a hierarchical structure between transformation units according to transformation depths in a same region, according to results of performing transformation according to levels of transformation depths in the current coding unit.

In other words, the transformation units having the tree structure may be determined by comparing the results of performing transformation by using transformation units having various sizes according to coding units. While determining coding units, transformation units for transforming the coding units may be determined. Transformation units of one or more transformation depths may be used according to deeper coding units of one or more depths and coded depths.

A transformation unit having a least encoding error may be determined per coding unit. In order to determine a transformation depth that generates a least encoding error in the transformation unit, encoding errors may be measured and compared according to transformation units of all transformation depths. The transformation unit may be determined as a data unit that reduces an error according to transformation of a coding unit.

Accordingly, since a combination having a least encoding error is determined from among combinations of deeper coding units and transformation units, and a combination is individually determined according to regions in a maximum coding unit, coding units having a tree structure and transformation units having a tree structure may be determined.

Methods of determining coding units having a tree structure in a maximum coding unit, partitions, and transformation units having a tree structure, according to exemplary embodiments, will be described in detail later with reference to FIGS. 15 through 25.

The picture hierarchical encoder 120 may measure an encoding error of deeper coding units according to depths by using Rate-Distortion Optimization based on Lagrangian multipliers.

The video encoding apparatus 100 may output the image data of the maximum coding unit, which is encoded based on the at least one coded depth determined by the picture hierarchical encoder 120, and information about the encoding mode according to the coded depth, which is encoded by the hierarchical symbol encoder 130, in bitstreams.

The information about the encoding mode determined as the picture is encoded based on the coding units, prediction units, and transformation units having the tree structure may be included in a header, SPS, or PPS of the bitstream.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the hierarchical symbol encoder 130 may assign encoding information about a corresponding coded depth and an encoding mode to at least one of the coding unit, the prediction unit, and a minimum unit included in the maximum coding unit.

The minimum unit is a square data unit obtained by splitting the minimum coding unit constituting the lowermost depth by 4. Alternatively, the minimum unit may be a maximum square data unit that may be included in all of the coding units, prediction units, partition units, and transformation units included in the maximum coding unit.

For example, the encoding information output through the hierarchical symbol encoder 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header, SPS, or PPS of a bitstream.

Also, information about a symbol encoding method used to encode a current video or about a symbol decoding method required to decode the current video may be output through a header, SPS, or PPS of the bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The hierarchical symbol encoder 130 may encode and output encoding information indicating information about an encoding method used to encode a video based on coding units having a hierarchical structure and transformation units having a tree structure. The encoding information may include information about a coded depth and information about various encoding modes of coding units of coded depths.

As the video is encoded based on the coding units having the tree structure and the transformation units having the tree structure, the encoding information may also have a tree structure according to the coding units and the transformation units.

The hierarchical symbol encoder 130 may encode encoding information having a tree structure as symbols. As described above with reference to FIGS. 1 through 14, the hierarchical symbol encoder 130 may selectively determine a symbol encoding method based on symbol characteristics of information about an encoding mode in a tree structure. The information about the encoding mode in the tree structure may be encoded based on a determined symbol encoding method. The information about the symbol encoding method may be encoded to be output with the encoding information.

Accordingly, the hierarchical symbol encoder 130 of the video encoding apparatus 100 may output the encoding information of the coding units having the tree structure and the symbol encoding method information, according to maximum coding units. Accordingly, the bitstream encoded and output by the video encoding apparatus 100 may include the encoded data, the encoding information, and the symbol encoding method information of the picture encoded according to the coding units having the tree structure.

Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The video decoding apparatus 200 receives a bitstream of an encoded video. The hierarchical symbol and data extractor 220 parses the received bitstream. The hierarchical symbol and data extractor 220 extracts encoded image data for each coding unit from the parsed bitstream, wherein the coding units have a tree structure according to each maximum coding unit, and outputs the extracted image data to the hierarchical picture decoder 230. The hierarchical symbol and data extractor 220 may extract information about a maximum size of a coding unit of a current picture, from a header, SPS, or PPS about the current picture.

Also, the hierarchical symbol and data extractor 220 extracts encoding information about the coding units having a tree structure according to each maximum coding unit, from the parsed bitstream. Information about the coded depth and the encoding mode are extracted from the encoding information. The extracted information about the coded depth and the encoding mode is output to the hierarchical picture decoder 230. In other words, the image data in a bit string is split into the maximum coding unit so that the hierarchical picture decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the hierarchical symbol and data extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may reconstruct an image by decoding the image data according to a coded depth and an encoding mode that generates the minimum encoding error.

The hierarchical symbol and data extractor 220 may also extract symbol decoding method information required to decode the symbols having the tree structure described with reference to FIGS. 1 through 14, from the bitstream. The extracted symbol decoding method information may correspond to the symbol encoding method information transmitted by the video encoding apparatus 100.

Also, the hierarchical symbol and data extractor 220 may extract encoding information required to decode the received bitstream from the header, SPS, or PPS of the bitstream. The hierarchical symbol and data extractor 220 may also extract the symbol decoding method information from the header, SPS, or PPS of the bitstream. The encoding information and the symbol decoding method information may be extracted from not only the picture or the slice, but also from the maximum coding unit or the coding unit.

The hierarchical picture decoder 230 may decode and read the encoding information having the tree structure from the extracted encoding information based on the symbol decoding method determined according to the symbol decoding method information. Even if only some of encoding information having the tree structure is received, all of encoding information having the tree structure may be restored and read via symbol decoding according to the symbol decoding method. Accordingly, the information about the coded depth and encoding mode required to decode the encoded picture based on the coding units having the tree structure according to the maximum coding units may be read.

Since encoding information about the coded depth and the encoding mode may be assigned to a predetermined data unit from among a corresponding coding unit, a prediction unit, and a minimum unit, the hierarchical symbol and data extractor 220 may extract the information about the coded depth and the encoding mode according to the predetermined data units. If information about a coded depth and encoding mode of a corresponding maximum coding unit is recorded according to predetermined data units, the predetermined data units to which the same information about the coded depth and the encoding mode is assigned may be inferred to be the data units included in the same maximum coding unit.

The hierarchical picture decoder 230 may determine at least one coded depth of a current maximum coding unit by using split information according to depths. If the split information indicates that image data is no longer split in the current depth, the current depth is a coded depth. Accordingly, the hierarchical picture decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The hierarchical picture decoder 230 may reconstruct the current picture by decoding the image data in each maximum coding unit based on the information about the coded depth and the encoding mode according to the maximum coding units. In other words, the hierarchical picture decoder 230 may read the partition type, the prediction mode, and the transformation unit as encoding modes for each coding unit from among the coding units having the tree structure included in each maximum coding unit. A decoding process may include a prediction including intra prediction and motion compensation, and an inverse transformation.

The hierarchical picture decoder 230 may perform intra prediction or motion compensation according to a partition and a prediction mode of each coding unit, based on the information about the partition type and the prediction mode of the prediction unit of the coding unit according to coded depths.

Also, the hierarchical picture decoder 230 may read the structure of the transformation units having the tree structure, and perform inverse transformation based on the transformation units according to the coding units.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and reconstructed by using a size of a coding unit and an encoding mode, which are adaptively determined according to characteristics of the image data, by using information about an optimum encoding mode received from an encoder.

Figure 15:
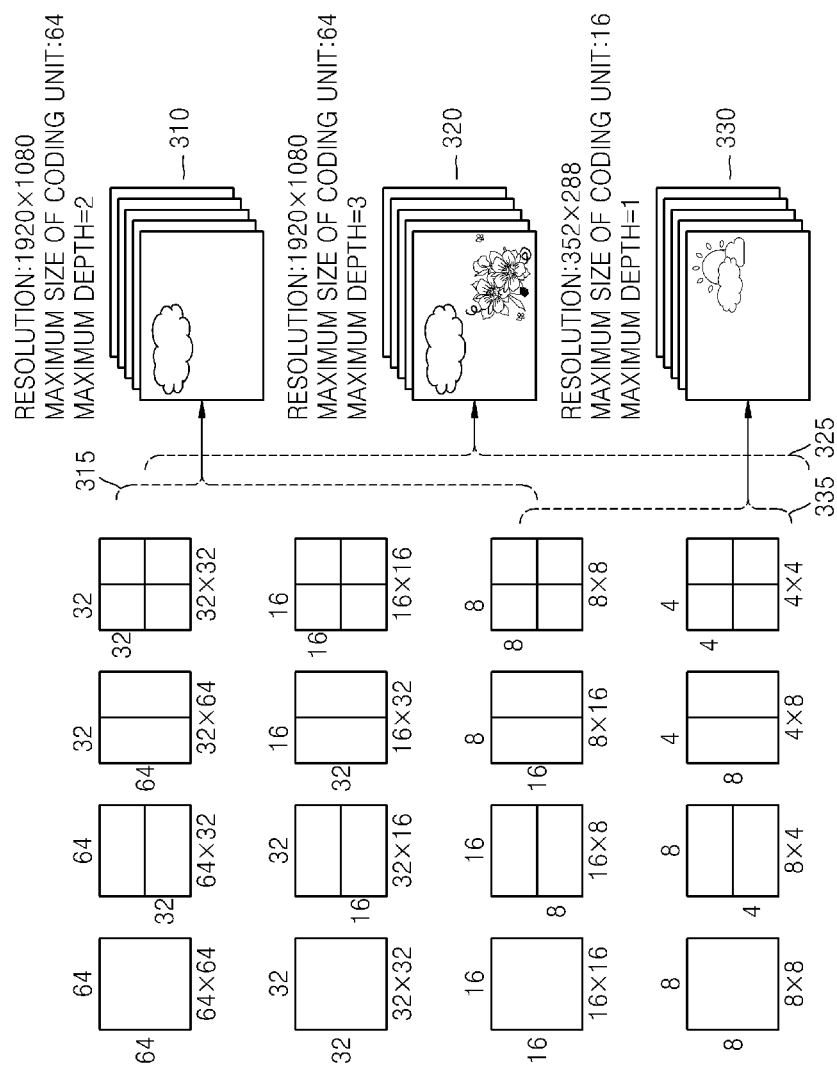
FIG. 15 is a diagram for describing a concept of coding units according to an exemplary embodiment.

FIG. 15 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 15 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 16:
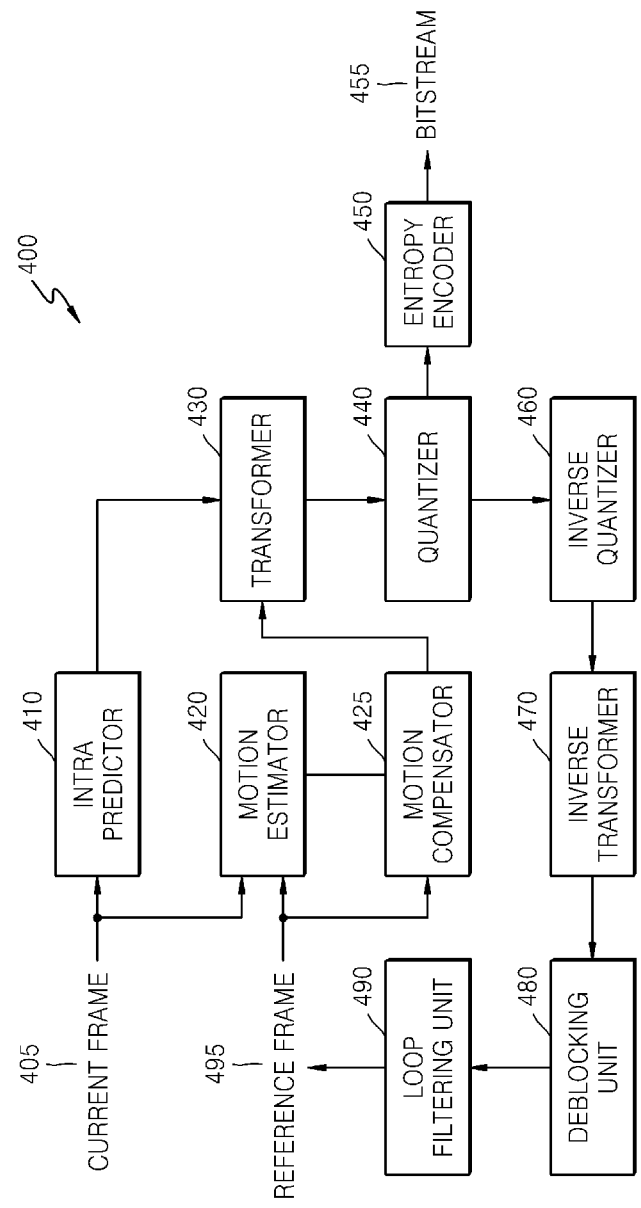
FIG. 16 is a block diagram of an image encoder based on coding units according to an exemplary embodiment.

FIG. 16 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is reconstructed as data in a spatial domain through an inverse quantizer 460 and an inverse transformer 470, and the reconstructed data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 17:
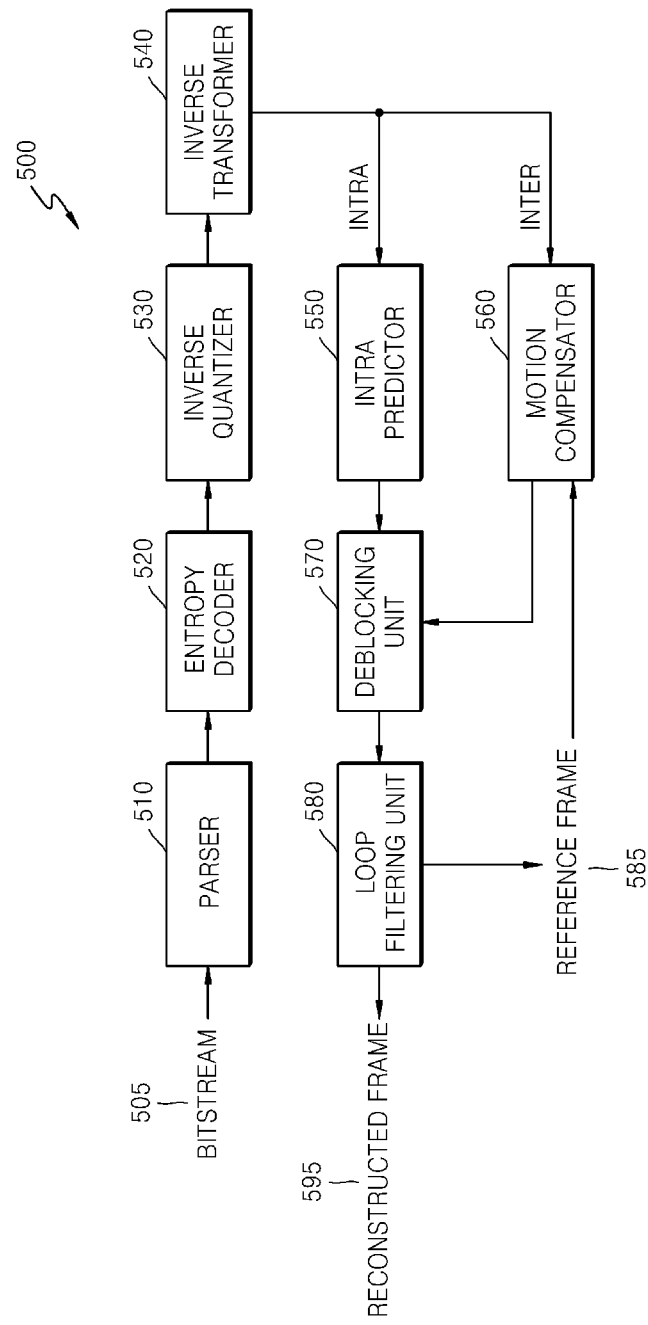
FIG. 17 is a block diagram of an image decoder based on coding units according to an exemplary embodiment.

FIG. 17 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is reconstructed to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a reconstructed frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

Figure 18:
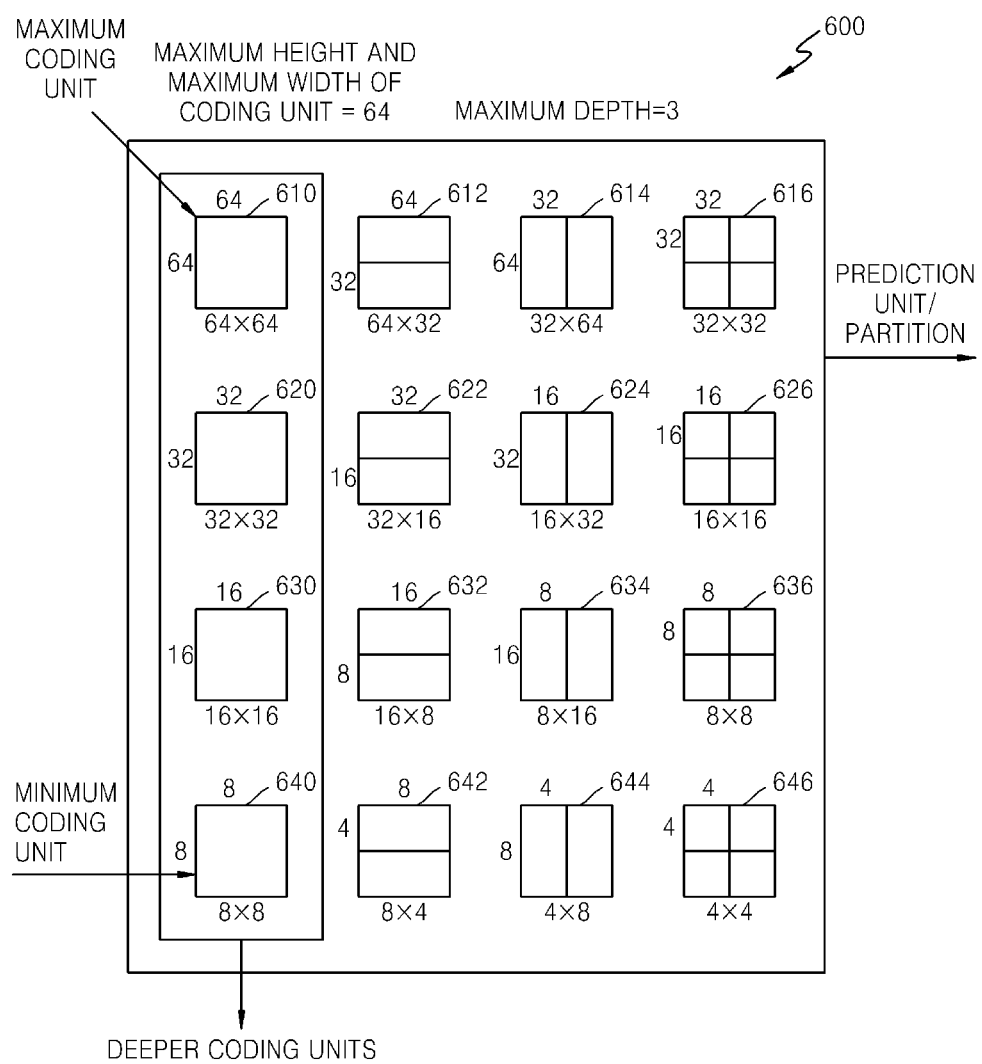
FIG. 18 is a diagram illustrating deeper coding units according to depths, and partitions according to an exemplary embodiment.

FIG. 18 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, the maximum height and the maximum width of the coding units are each 64, and the maximum depth is 3. Here, a maximum depth denotes a total number of times a coding unit is split from a maximum coding unit to a minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 exist. The coding unit 640 having the size of 8×8 and the depth of 3 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the picture hierarchical encoder 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 19 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 20 is a diagram for describing encoding information of coding units corresponding to a coded depth, according to an exemplary embodiment.

The hierarchical symbol encoder 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 21:
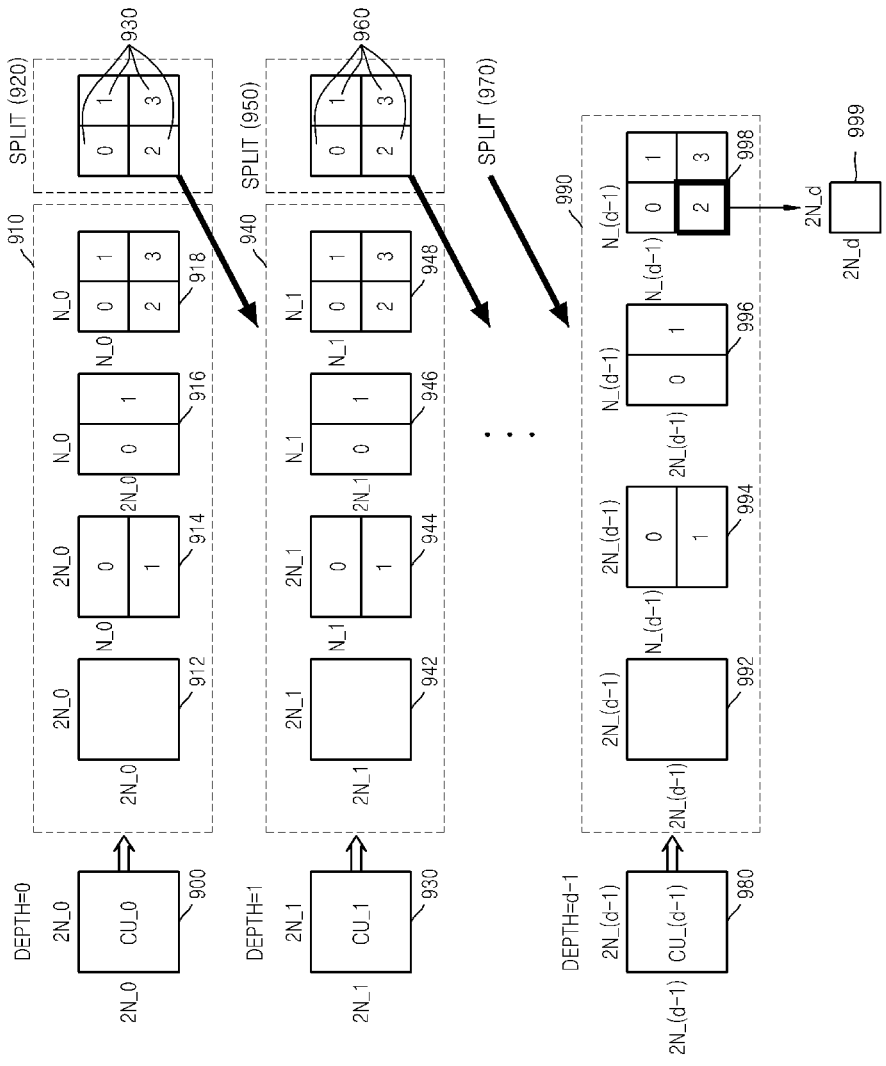
FIG. 21 is a diagram of deeper coding units according to depths, according to an exemplary embodiment.

FIG. 21 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0× N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a square data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The hierarchical symbol and data extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 22:
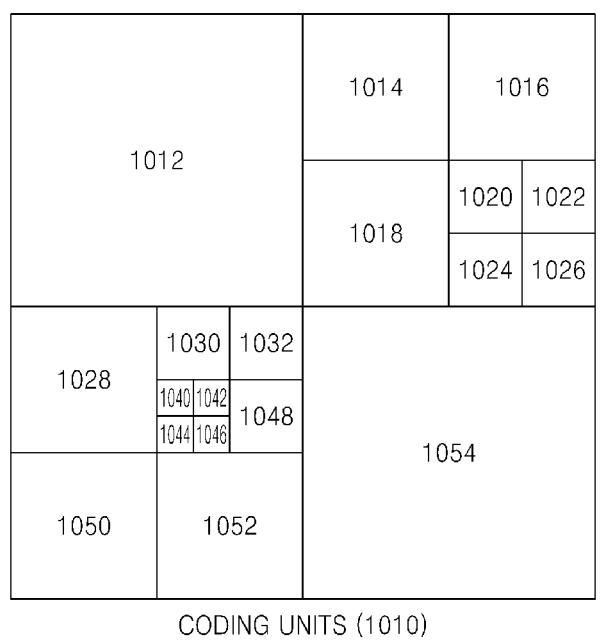
FIGS. 22 through 24 are diagrams for describing a relationship between coding units, prediction units, and transformation units, according to an exemplary embodiment.
Figure 23:
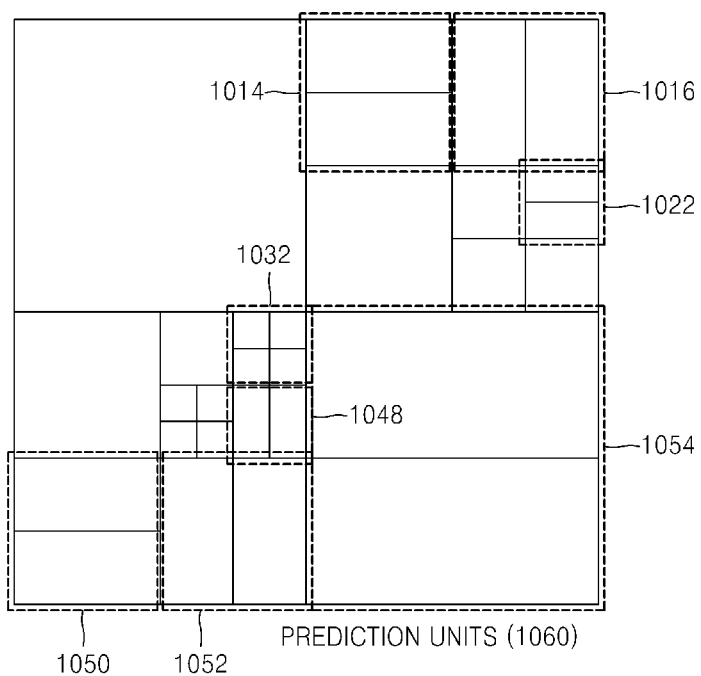
Figure 24:
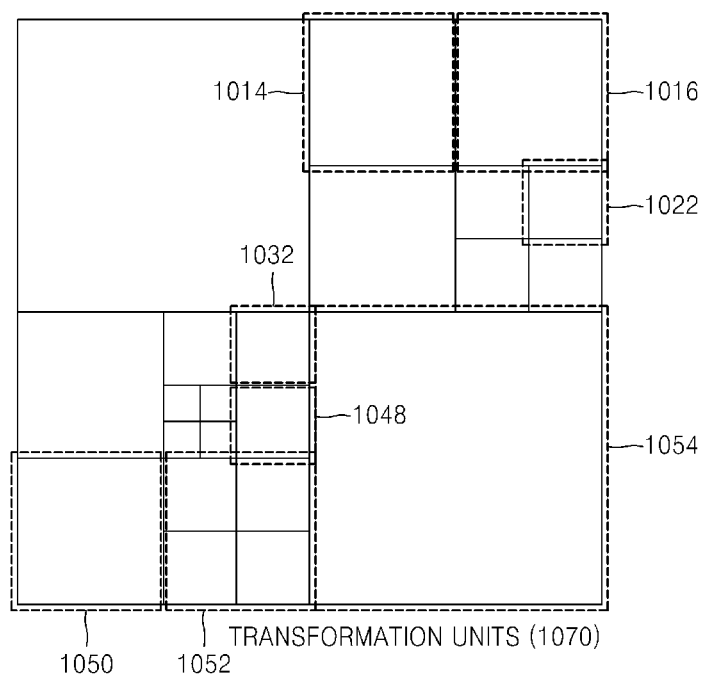

FIGS. 22 through 24 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

TABLE 0

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The hierarchical symbol encoder 130 of the video encoding apparatus 100 may output the encoding information about the coding units having a tree structure, and the hierarchical symbol and data extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 25:
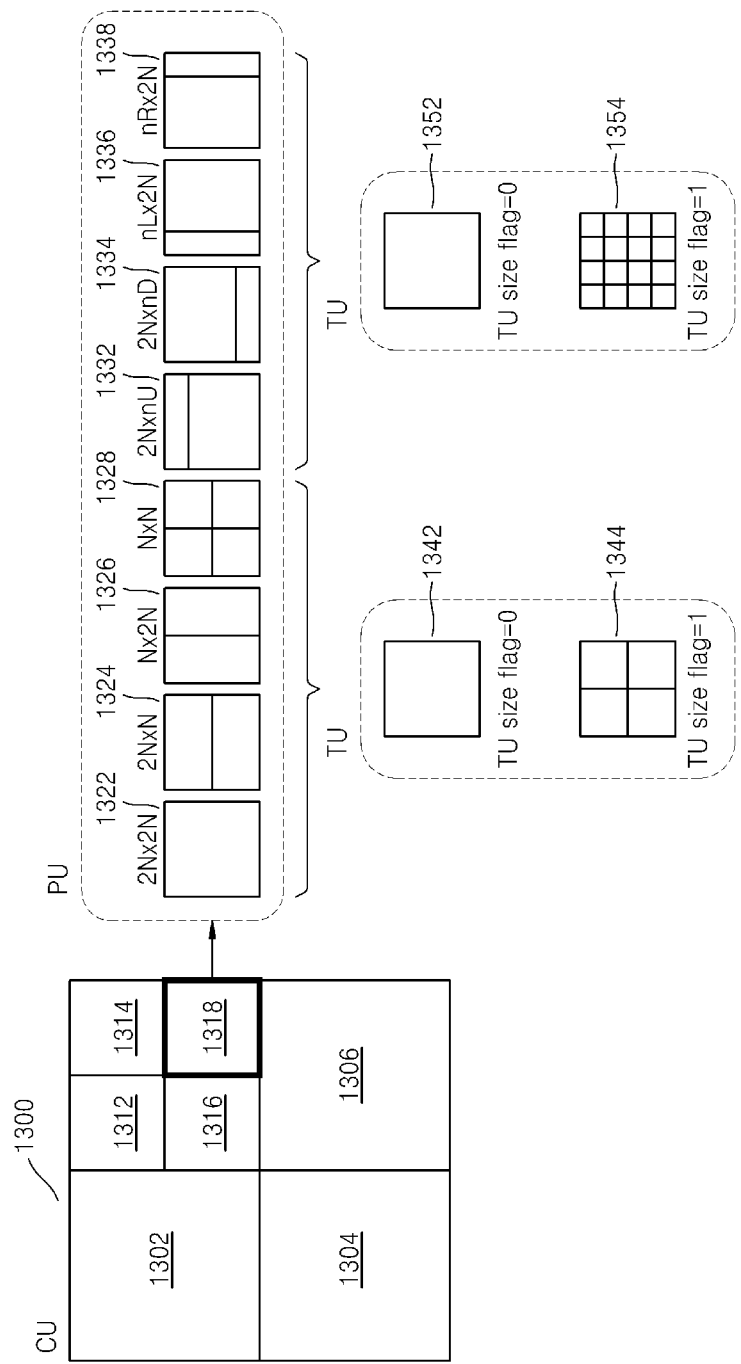
FIG. 25 is a diagram for describing a relationship between a coding unit, a prediction unit or a partition, and a transformation unit, according to encoding mode information of Table 0.

FIG. 25 is a diagram for describing a relationship between a coding unit, a prediction unit or a partition, and a transformation unit, according to encoding mode information of Table 0.

A maximum coding unit 1300 includes coding units 1302, 1304, 1306, 1312, 1314, 1316, and 1318 of coded depths.

Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Transformation unit split information TU size flag may be a type of a transformation index, and a size of a transformation unit corresponding to a transformation index may vary according to a prediction unit type or partition type of a coding unit.

For example, when the partition type is set to be symmetrical, i.e., the partition type 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 21, the TU size flag is a flag having a value or 0 or 1, but the TU size flag is not limited to 1 bit, and a transformation unit may be hierarchically split having a tree structure while the TU size flag increases from 0. The TU size flag may be used as an example of a transformation index.

In this case, the size of a transformation unit that has been actually used may be expressed by using a TU size flag of a transformation unit, together with a maximum size and minimum size of the transformation unit. The video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode video by using the maximum transformation unit size information, the minimum transformation unit size information, and the maximum TU size flag.

For example, if the size of a current coding unit is 64×64 and a maximum transformation unit size is 32×32, then the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, then the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

The maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and one or more other exemplary embodiments are not limited thereto.

Figure 26:
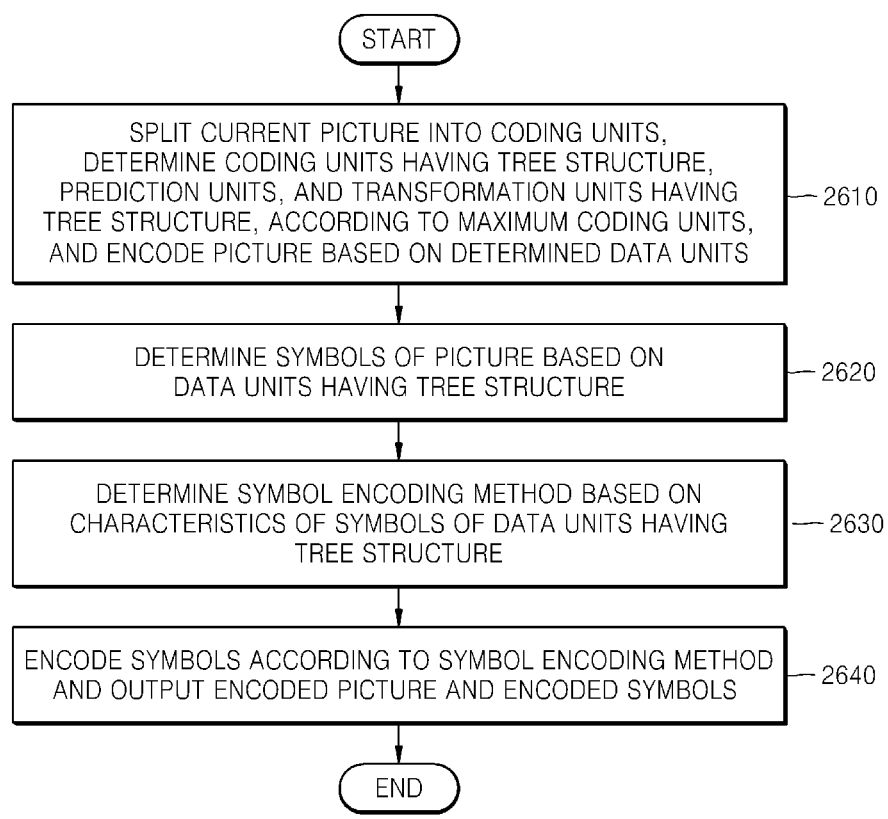
FIG. 26 is a flowchart illustrating a video encoding method, wherein symbols having a tree structure based on coding units and transformation units having a tree structure are encoded, according to an exemplary embodiment.

FIG. 26 is a flowchart illustrating a video encoding method, wherein symbols having a tree structure based on coding units and transformation units having a tree structure are encoded, according to an exemplary embodiment.

In operation 2610, a current picture is split into at least one maximum coding unit. Here, a maximum depth indicating a total number of splitting the current picture may be predetermined.

At least one split region obtained by splitting a region of the maximum coding unit according to depths may be encoded. Here, encoding results of the split regions may be compared according to depths to determine a split depth for outputting a final encoding result according to the at least one split region, and determine coding units having a tree structure included in a current maximum coding unit. Like the coding units having the tree structure, transformation units having a tree structure may be determined. In other words, like encoding result of the picture output as the determined coding units having the tree structure, the encoding result of the transformation unit having the tree structure may be output as the encoded data of the picture.

In operation 2620, symbols of the encoded picture are determined based on the data units having the hierarchical structure. Image data that is a final encoding result according to at least one split region of each maximum coding unit, and information about a coded depth and an encoding mode are determined. The information about the encoding mode may include information about the coded depth, split information, partition type information of a prediction unit, prediction mode information, or information about a hierarchical structure of a transformation unit. The encoded information about the encoding mode may be transmitted to a decoder together with the encoded image data.

In operation 2630, a symbol encoding method may be selectively determined by considering symbol characteristics of the data units having the tree structure. The symbol encoding method may be selectively determined from among a symbol hierarchical encoding mode, wherein symbols determined according to data units having a hierarchical structure are encoded according to the data units having the hierarchical structure, and a lowermost level encoding mode, wherein symbols of data units in a lowermost level are encoded.

Alternatively, the symbol encoding method may be selectively determined from among a homogeneous symbol group encoding mode, wherein homogeneous symbols are grouped and encoded, and a homogeneous symbol individual encoding mode, wherein homogeneous symbols are individually encoded, based on a correlation between symbol values of homogeneous symbols determined according to data units having a hierarchical structure.

Alternatively, the symbol encoding method may be selectively determined from among a heterogeneous symbol group encoding mode, wherein heterogeneous symbols are grouped and encoded, and a heterogeneous symbol individual encoding mode, wherein heterogeneous symbols are individually encoded, based on a correlation of heterogeneous symbols determined according to data units having a hierarchical structure. Here, the heterogeneous symbol group encoding mode may be determined based on at least one of a correlation of functions indicated by heterogeneous symbols having a hierarchical structure, dependent encoding, and sequential encoding.

Alternatively, the symbol encoding method may be selectively encoded form among a symbol reverse encoding mode, wherein symbol values of symbols of data units in a lowermost level are reversed and encoded, and a non-reverse encoding mode, wherein symbol values of symbols of data units in a lowermost level are encoded without being reversed, based on a ratio of symbol values that are 0 in symbol values of data units having a hierarchical structure.

The symbol encoding method may be determined according to each data section from among a slice, picture, sequence, and maximum coding unit of a video, and symbol encoding method information indicating the symbol encoding method may be encoded per data section.

In operation 2640, the symbols are encoded and output according to the symbol encoding method determined in operation 2630.

The symbols determined according to the data units having the hierarchical structure may be encoded and output according to the data units having the hierarchical structure, according to the symbol hierarchical encoding mode. Only the symbols of the data units in the lowermost level from among the data units having the hierarchical structure may be encoded and output according to the lowermost level encoding mode.

A symbol code table may be determined based on frequencies of patterns of symbol values of homogeneous symbols, and symbol codes of the homogeneous symbols may be output based on the patterns of the homogeneous symbols and the symbol code table, according to the homogenous symbol group encoding mode.

A context shared by heterogeneous symbols is determined and heterogeneous symbols of data units may be encoded and output based on the shared context, according to the heterogeneous symbol group encoding mode.

Symbol codes of heterogeneous symbols of data units may be output based on symbol codes assigned to combinations of symbol values of heterogeneous symbols that are interdependently or sequentially determined, according to the heterogeneous symbol group encoding mode.

Symbol values of data units in a lowermost level may be reversed, and symbols may be encoded and output accordingly, according to the symbol reverse encoding mode.

Figure 27:
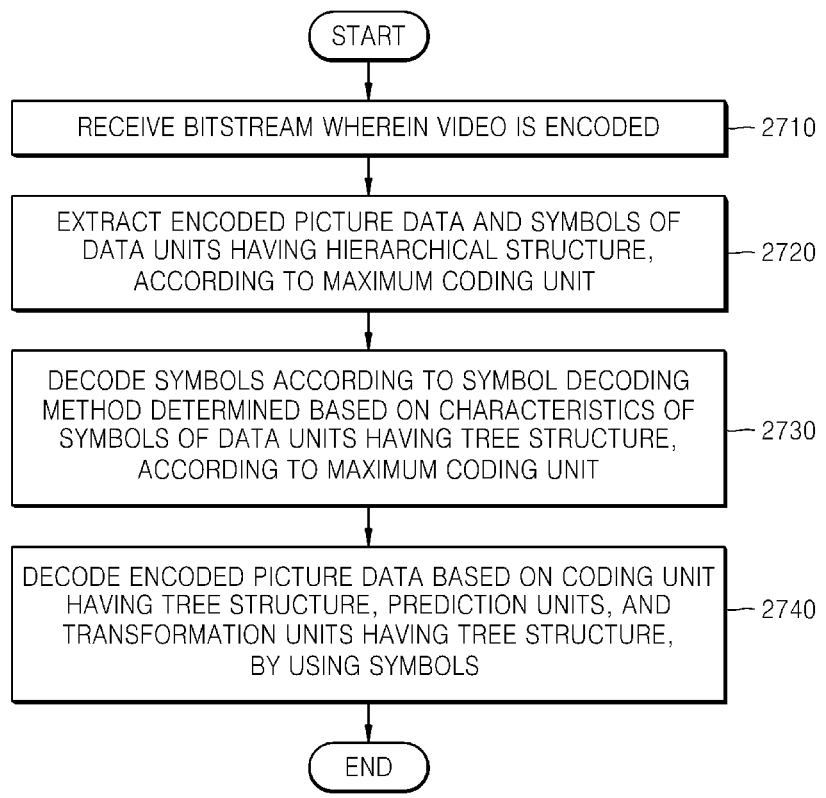
FIG. 27 is a flowchart illustrating a video decoding method, wherein symbols having a tree structure based on coding units and transformation units having a tree structure are decoded, according to an exemplary embodiment.

FIG. 27 is a flowchart illustrating a video decoding method, wherein symbols having a tree structure based on coding units and transformation units having a tree structure are decoded, according to an exemplary embodiment.

In operation 2710, a bitstream of an encoded video is received and parsed.

In operation 2720, image data of a current picture assigned to at least one maximum coding unit, and information about coded depth and encoding mode according to the at least one maximum coding unit are extracted from the parsed bitstream. Alternatively, symbol decoding method information of symbols having a tree structure may be extracted.

In operation 2730, a symbol decoding method may be selectively determined based on characteristics of the symbols having the tree structure. According to the tree structure, symbols in all levels may be decoded, symbols of certain locations may be decoded, or combinations of symbols may be decoded.

Symbols having a hierarchical structure may be decoded according to a symbol hierarchical decoding mode or a lowermost level decoding mode. Alternatively, the symbols having the hierarchical structure may be decoded according to a homogeneous symbol group decoding mode. Alternatively, the symbols having the hierarchical structure may be decoded according to a heterogeneous symbol group decoding mode. Alternatively, the symbols having the hierarchical structure may be decoded according to a symbol reverse decoding mode.

Symbol decoding method information indicating a symbol decoding method is extracted according to each data section from among a slice, picture, sequence, and maximum coding unit of a video, and the symbol decoding method may be determined according to the data sections based on the symbol decoding method information.

Information about a coded depth and an encoding mode may be read as the symbols are decoded. According to the information about the coded depth and the encoding mode, a maximum coding unit may be split into coding units having a tree structure. Also, according to information about a hierarchical structure of transformation units from among extracted information, transformation units having transformation depths according to a tree structure in the coding unit may be determined.

In operation 2740, image data of each maximum coding unit may be decoded based on coding units having a tree structure, prediction units, and transformation units having a tree structure, by using the information about the coded depth and the encoding mode. A current coding unit may be inverse-transformed by using a transformation unit determined from among the transformation units having the tree structure, while the current coding unit is decoded based on the information about the coded depth and the encoding mode.

Image data in a spatial domain is reconstructed as the at least one maximum coding unit is decoded according to the coding units, and thus a picture and a video that is a picture sequence may be reconstructed. The reconstructed video may be reproduced by a reproducing apparatus, stored in a storage medium, or transmitted via a network.

Symbols are efficiently encoded since a suitable symbol encoding method is determined according to symbol characteristics of symbols having a tree structure, which are determined during an encoding process according to coding units having a tree structure and transformation units having a tree structure, according to symbol encoding and symbol decoding. Also, even if only some of symbols having a tree structure determined during an encoding process according to coding units having a tree structure and transformation units having a tree structure are received, remaining symbols can be all restored according to a symbol decoding method, and thus symbols may be efficiently decoded.

Accordingly, during a video encoding process, since a video is encoded based on coding units having a tree structure, transformation units having a tree structure, and prediction units, encoding information about an encoding method and an encoding mode may be encoded in order to accurately decode the video. The encoding information may be encoded as symbols and output in a form of symbol codes. During a video decoding process, since encoding information about an encoded picture is read based on coding units having a tree structure, transformation units having a tree structure, and prediction units, from decoded symbols, a video may be reconstructed by reconstructing a picture and a picture sequence by using the encoding information.

Exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Moreover, it is understood that in exemplary embodiments, one or more units of the above-described apparatuses can include circuitry, a processor, a microprocessor, etc., and may execute a computer program stored in a computer-readable medium.

While exemplary embodiments have been particularly shown and described above, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of exemplary embodiments but by the appended claims, and all differences within the scope will be construed as being included in the present invention.

The invention claimed is:

1. A video encoding method performed by a video encoder for encoding symbols having a hierarchical structure, the video encoding method comprising:
encoding, by the video encoder based on data units having a hierarchical structure, a picture of a video;
determining, by the video encoder based on the data units having the hierarchical structure, symbols of the encoded picture;
determining, by the video encoder based on characteristics of the symbols, an encoding method of the symbols, the characteristics of the symbols being determined based on the data units having the hierarchical structure; and
encoding and outputting, by the video encoder, the symbols according to the determined encoding method,
wherein:
the determining the encoding method comprises selectively determining a symbol encoding method from among a symbol reverse encoding mode and a non-reverse encoding mode;
in the symbol reverse encoding mode, symbol values of symbols of data units in a lowermost level are reversed and encoded; and
in the non-reverse encoding mode, symbol values of symbols of data units in a lowermost level are encoded without being reversed, based on a ratio of symbol values that are 0 from among symbol values of the data units having the hierarchical structure.

2. The video encoding method of claim 1, wherein:
the determining the encoding method comprises selectively determining, based on encoding characteristics of the data units used to encode the symbols, a symbol encoding method, from among a symbol hierarchical encoding mode and a lowermost level encoding mode, with respect to the data units having the hierarchical structure;
in the symbol hierarchical encoding mode, the determined symbols are encoded according to the data units having the hierarchical structure; and
in the lowermost level encoding mode, symbols of data units in a lowermost level from among the data units having the hierarchical structure are encoded.

3. The video encoding method of claim 1, wherein:
the selectively determining the encoding method comprises selectively determining, based on encoding characteristics the data units used to encode the symbols with respect to the data units, a symbol encoding method from among a homogeneous symbol group encoding mode and a homogeneous symbol individual encoding mode;
in the homogeneous symbol group encoding mode, homogeneous symbols determined according to the data units having the hierarchical structure are grouped and encoded based on a correlation between symbol values of the homogeneous symbols;
in the homogeneous symbol individual encoding mode, the homogeneous symbols are individually encoded; and
types of symbols to be grouped and encoded based on the correlation between the symbol values of the homogeneous symbols comprise at least one of skip mode information, coding unit split information, transformation unit split information, and encoding pattern information.

4. The video encoding method of claim 1, wherein:
the determining the encoding method comprises selectively determining a symbol encoding method from among a heterogeneous symbol group encoding mode and a heterogeneous symbol individual encoding mode;
in the heterogeneous symbol group encoding mode, heterogeneous symbols determined according to the data units having the hierarchical structure are grouped and encoded based on a correlation between symbol values of heterogeneous symbols;
in the heterogeneous symbol individual encoding mode, the heterogeneous symbols are individually encoded;
combinations of heterogeneous symbols to be grouped and encoded based on the correlation comprise at least one of a combination of coding unit split information and transformation unit split information, a combination of transformation unit split information and encoding pattern information, a combination of coding unit prediction mode and prediction method information, a combination of coding unit split information and skip information, a combination of encoding pattern information according to two or more color components, and a combination of encoding pattern information according to two or more color components and transformation unit split information; and the encoding pattern information according to two or more color components comprises at least one of luma component encoding pattern information, chroma component encoding pattern information, first chroma component encoding pattern information, and second chroma component encoding pattern information.

5. The video encoding method of claim 1, wherein the selectively determining the encoding method comprises:

selectively determining the encoding method based on encoding characteristics of the data unit comprising at least one of prediction mode information of the symbols, a slice type, a color component, a coding unit split level, and a transformation unit split level; and determining the encoding method according to each data section from among a slice, picture, sequence, and maximum coding unit of the video, wherein the video encoding method further comprises outputting symbol encoding method information indicating the encoding method, according to the each data section.

6. A video decoding method performed by a video decoder for decoding symbols having a hierarchical structure, the video decoding method comprising:

receiving, by the video decoder, a bitstream comprising an encoded picture of a video;

extracting, by the video decoder, from the bitstream by parsing the bitstream, the encoded picture and symbols determined based on data units having a hierarchical structure; and decoding, by the video decoder, using the symbols, the encoded picture after determining, based on characteristics of the symbols, a decoding method of the symbols, the characteristics of the symbols determined based on the data units having the hierarchical structure, and decoding the symbols according to the decoding method, wherein:

the decoding comprises selectively determining, based on a ratio of symbol values that are 0 from among symbol values of the data units having the hierarchical structure, a symbol decoding method from among a symbol reverse decoding mode and a non-reverse decoding mode:

in the symbol reverse decoding mode, symbol values of symbols of data units in a lowermost level are reversed and decoded; and in the non-reverse decoding mode, symbol values of symbols of data units in a lowermost level are decoded without being reversed.

7. The video decoding method of claim 6, wherein:

the decoding comprises selectively determining, based on encoding characteristics of the data units used to decode the symbols with respect to the data units, a symbol decoding method, from among a symbol hierarchical decoding mode and a lowermost level decoding mode, with respect to the data units having the hierarchical structure;

in the symbol hierarchical decoding mode, the determined symbols are decoded according to the data units having the hierarchical structure; and in the lowermost level decoding mode, symbols of data units in a lowermost level from among the data units having the hierarchical structure are decoded.

8. The video decoding method of claim 6, wherein:

the decoding comprises selectively determining, based on encoding characteristics of the data units used to decode the symbols with respect to the data units, a symbol decoding method from among a homogeneous symbol group decoding mode and a homogeneous symbol individual decoding mode;

in the homogeneous symbol group decoding mode, homogeneous symbols determined according to the data units having the hierarchical structure are grouped and encoded based on a correlation between symbol values of the homogeneous symbols;

in the homogeneous symbol individual decoding mode, the homogeneous symbols are individually encoded; and types of symbols to be decoded in the homogeneous symbol group decoding mode comprise at least one of skip mode information, coding unit split information, transformation unit split information, and encoding pattern information.

9. The video decoding method of claim 6, wherein:

the decoding comprises selectively determining, based on a correlation between symbol values of heterogeneous symbols, a symbol decoding method from among a heterogeneous symbol group decoding mode and a heterogeneous symbol individual decoding mode;

in the heterogeneous symbol group decoding mode, heterogeneous symbols determined according to the data units having the hierarchical structure are grouped and decoded;

in the heterogeneous symbol individual decoding mode, the heterogeneous symbols are individually decoded;

combinations of heterogeneous symbols to be encoded in the heterogeneous symbol group decoding mode comprise at least one of a combination of coding unit split information and transformation unit split information, a combination of transformation unit split information and encoding pattern information, a combination of coding unit prediction mode and prediction method information, a combination of coding unit split information and skip information, a combination of encoding pattern information according to two or more color components, and a combination of encoding pattern information according to two or more color components and transformation unit split information; and the encoding pattern information according to two or more color components comprises at least one of luma component encoding pattern information, chroma component encoding pattern information, first chroma component encoding pattern information, and second chroma component encoding pattern information.

10. The video decoding method of claim 1, wherein:

the extracting comprises extracting symbol decoding method information indicating a decoding method according to each data section from among a slice, picture, sequence, and maximum coding unit of the video; and the decoding comprises:

determining the decoding method according to each data section based on the extracted symbol decoding method information, and selecting the decoding method based on encoding characteristics of the data units comprising at least one of a prediction mode of the symbols, a slice type, a color component, a coding unit split level, and a transformation unit split level.

11. A video encoding apparatus for encoding symbols having a hierarchical structure, the video encoding apparatus comprising:

a picture hierarchical encoder which encodes, based on data units having a hierarchical structure, a picture of a video; and a hierarchical symbol encoder which determines, based on the data units having the hierarchical structure, symbols of the encoded picture, determines, based on characteristics of the symbols, an encoding method of the symbols, and encodes and outputs the symbols according to the determined encoding method, wherein the characteristics of the symbols are determined based on the data units having the hierarchical structure, and wherein:

the hierarchical symbol encoder determines the encoding method by selectively determining a symbol encoding method from among a symbol reverse encoding mode and a non-reverse encoding mode;

in the symbol reverse encoding mode, symbol values of symbols of data units in a lowermost level are reversed and encoded; and in the non-reverse encoding mode, symbol values of symbols of data units in a lowermost level are encoded without being reversed, based on a ratio of symbol values that are 0 from among symbol values of the data units having the hierarchical structure.

12. A video decoding apparatus for decoding symbols having a hierarchical structure, the video decoding apparatus comprising:

a hierarchical symbol and data extractor which receives a bitstream comprising an encoded picture of a video, and extracts, from the bitstream by parsing the bitstream, the encoded picture and symbols determined based on data units having a hierarchical structure; and a hierarchical picture decoder which decodes the encoded picture by using the symbols after determining, based on characteristics of the symbols, a decoding method of the symbols, decodes the symbols according to the decoding method, wherein the characteristics of the symbols are determined based on the data units having the hierarchical structure, and wherein:

the hierarchical picture decoder selectively determines, based on a ratio of symbol values that are 0 from among symbol values of the data units having the hierarchical structure, a symbol decoding method from among a symbol reverse decoding mode and a non-reverse decoding mode;

in the symbol reverse decoding mode, symbol values of symbols of data units in a lowermost level are reversed and decoded; and in the non-reverse decoding mode, symbol values of symbols of data units in a lowermost level are decoded without being reversed.

13. A non-transitory computer-readable recording medium having recorded thereon a program for executing the method of claim 1.

14. A non-transitory computer-readable recording medium having recorded thereon a program for executing the method of claim 6.

15. The video encoding method of claim 1, wherein the symbols of the encoded picture comprise encoding information indicating an encoding mode used to encode the picture.

16. The video encoding method of claim 1, wherein the symbols of the encoded picture comprise prediction mode information indicating a prediction method used to encode the picture.

17. The video encoding method of claim 16, wherein the encoding method of the symbols is determined according to the prediction method.

* * * * *